United States Patent [19]

Abe

[11] 4,279,022
[45] Jul. 14, 1981

[54] ELECTRONIC CALCULATION/MEMORANDUM APPARATUS

[75] Inventor: Kazuhiro Abe, Yokosuka, Japan

[73] Assignee: Tokyo Shibaura Electric Co., Ltd., Kawasaki, Japan

[21] Appl. No.: 154,289

[22] Filed: May 29, 1980

Related U.S. Application Data

[63] Continuation of Ser. No. 904,773, May 11, 1978, abandoned.

[30] Foreign Application Priority Data

| May 14, 1977 | [JP] | Japan | 52/55847 |
| Dec. 9, 1977 | [JP] | Japan | 52/147807 |
| Dec. 24, 1977 | [JP] | Japan | 52/155823 |

[51] Int. Cl.[3] .......................... G06F 3/02; G06F 3/14
[52] U.S. Cl. ................................ 364/900; 364/705; 364/709
[58] Field of Search ............... 364/200, 900, 709, 705

[56] References Cited

U.S. PATENT DOCUMENTS

| 3,760,171 | 9/1973 | Wang | 364/200 |
| 3,865,994 | 2/1975 | Bender | 179/90 K |
| 3,920,979 | 11/1975 | Kilby et al. | 364/705 |
| 3,999,050 | 12/1976 | Pitroda | 364/705 |
| 4,028,538 | 6/1977 | Olander, Jr. | 364/709 |
| 4,117,542 | 9/1978 | Klausner | 364/709 |

Primary Examiner—Gareth D. Shaw
Assistant Examiner—David Y. Eng
Attorney, Agent, or Firm—Cushman, Darby & Cushman

[57] ABSTRACT

An electronic calculation/memorandum apparatus comprises: a main memory; a key input unit including character keys, numerical keys, symbol keys, and a character mode selection key, a data write-in key for the main memory, and a data read-out key for the main memory; means for setting the main memory to a write mode through the operation of the write-in key; means for writing index data including characters and/or symbols inputted from the key input unit and numerical data associated with the index data in the order of inputting of them into the input key, into the main memory successively from the head address and the succeeding ones; means for alternately reading out all the index data and numerical data stored in the main memory in the order of the writing thereof in the read-out mode and for displaying them; means for retrieving the numerical data corresponding to the index data inputted from the main memory and for displaying it; and a unit for performing calculation on the basis of numerical data inputted through the operation of the numerical key.

29 Claims, 36 Drawing Figures

FIG. 8
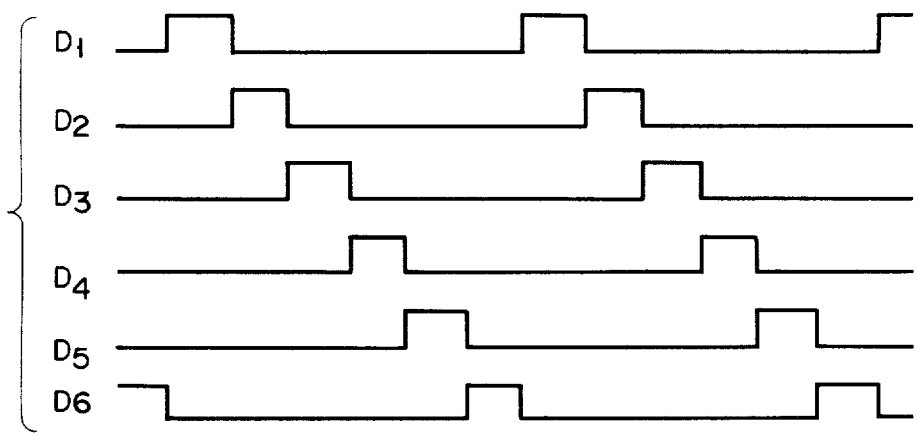
FIG. 10
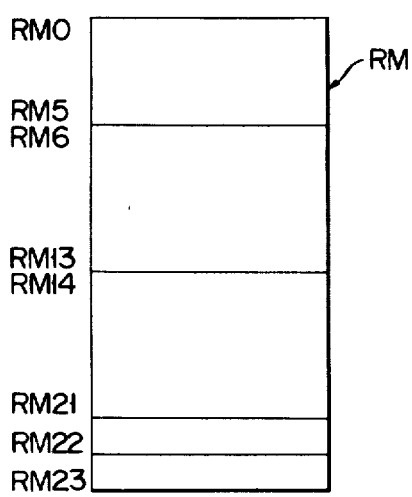
FIG. 11
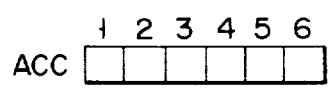
FIG. 12A
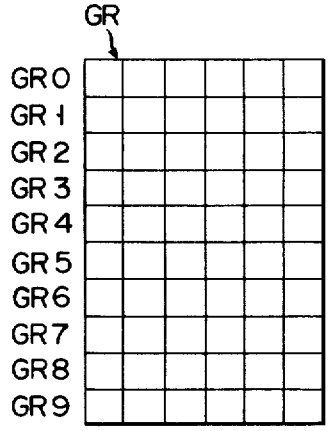
FIG. 12B
| | 1 | 2 | 3 | 4 | 5 | 6 |
|---|---|---|---|---|---|---|
| GR8 | — | M | E | COIN | R | CALL |
| GR9 | C | ∝ | L | AR | W | CON |

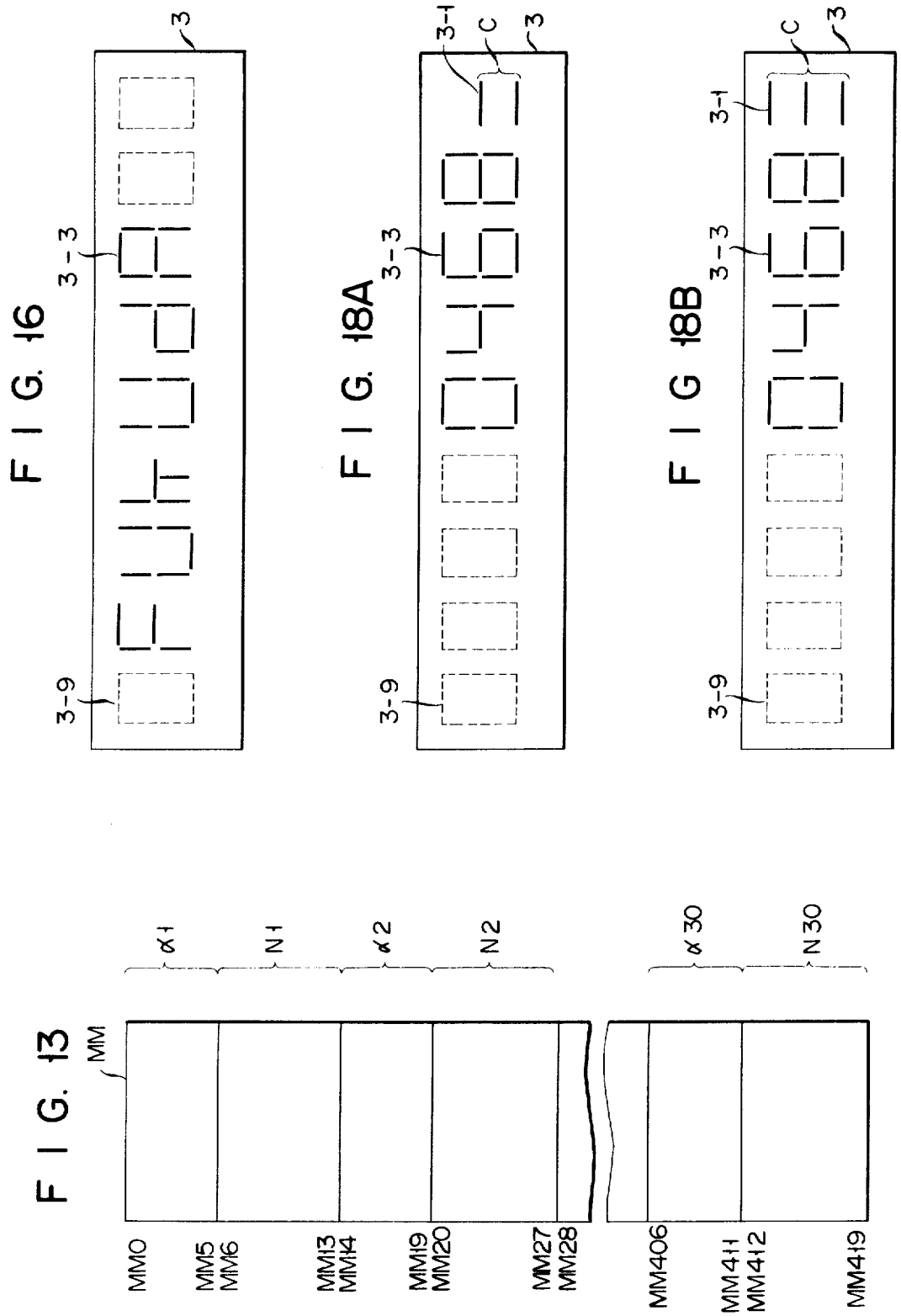

| | 0 | | 1 | | 2 | | 3 | |
|---|---|---|---|---|---|---|---|---|
| 0 | | 0 0 0 0 0 0 | √ | 0 1 0 0 0 0 | | 1 0 0 0 0 0 | P | 1 1 0 0 0 0 |
| 1 | 1 | 0 0 0 0 0 1 | C | 0 1 0 0 0 1 | A | 1 0 0 0 0 1 | Q | 1 1 0 0 0 1 |
| 2 | 2 | 0 0 0 0 1 0 | % | 0 1 0 0 1 0 | B | 1 0 0 0 1 0 | R | 1 1 0 0 1 0 |
| 3 | 3 | 0 0 0 0 1 1 | − | 0 1 0 0 1 1 | C | 1 0 0 0 1 1 | S | 1 1 0 0 1 1 |
| 4 | 4 | 0 0 0 1 0 0 | = | 0 1 0 1 0 0 | D | 1 0 0 1 0 0 | T | 1 1 0 1 0 0 |
| 5 | 5 | 0 0 0 1 0 1 | + | 0 1 0 1 0 1 | E | 1 0 0 1 0 1 | U | 1 1 0 1 0 1 |
| 6 | 6 | 0 0 0 1 1 0 | ⇆ | 0 1 0 1 1 0 | F | 1 0 0 1 1 0 | V | 1 1 0 1 1 0 |
| 7 | 7 | 0 0 0 1 1 1 | RM | 0 1 0 1 1 1 | G | 1 0 0 1 1 1 | W | 1 1 0 1 1 1 |
| 8 | 8 | 0 0 1 0 0 0 | M+ | 0 1 1 0 0 0 | H | 1 0 1 0 0 0 | X | 1 1 1 0 0 0 |
| 9 | 9 | 0 0 1 0 0 1 | M− | 0 1 1 0 0 1 | I | 1 0 1 0 0 1 | Y | 1 1 1 0 0 1 |
| A | 0 | 0 0 1 0 1 0 | X | 0 1 1 0 1 0 | J | 1 0 1 0 1 0 | Z | 1 1 1 0 1 0 |
| B | · | 0 0 1 0 1 1 | | 0 1 1 0 1 1 | K | 1 0 1 0 1 1 | MDC | 1 1 1 0 1 1 |
| C | Read | 0 0 1 1 0 0 | | 0 1 1 1 0 0 | L | 1 0 1 1 0 0 | CALL | 1 1 1 1 0 0 |
| D | Write | 0 0 1 1 0 1 | | 0 1 1 1 0 1 | M | 1 0 1 1 0 1 | CON | 1 1 1 1 0 1 |
| E | α | 0 0 1 1 1 0 | | 0 1 1 1 1 0 | N | 1 0 1 1 1 0 | (−) | 1 1 1 1 1 0 |
| F | | 0 0 1 1 1 1 | ÷ | 0 1 1 1 1 1 | O | 1 0 1 1 1 1 | | 1 1 1 1 1 1 |

ELECTRONIC CALCULATION/MEMORANDUM APPARATUS

This is a continuation of application Ser. No. 904,773 filed May 11, 1978, now abandoned.

BACKGROUND OF THE INVENTION

The invention relates to an electronic calculation/memorandum apparatus and, more particularly, to a portable type electronic calculation/memorandum apparatus of the type in which the various information desired to be memorized, particularly numerical data, are stored together with the index data associated therewith, inputting of specified index data into the apparatus enables the numerical data associated with the specified data inputted to be retrieved, and the calculation of numerical data may be performed.

By convention, it is common practice to use pocketbooks, scratch pads or the like for memorizing the necessary numerical data such as, phone numbers, numbers of credit cards, the number of a driving license, the date of birth, addresses, and train time tables. For memorizing the desired numerical data, one must write them on a recording medium such as a pocketbook by a writing means, for example, a pencile, a ball-point pen or the like. When written information is erronous or must be rewritten for some reason, it must be erased by an eraser or, if the erasing is impossible, it must be newly written in another space. Additionally, when desiring specified numerical data, one must carefully cast an eye over his pocketbook, for example, including a great amount of information. Therefore, it takes a long information searching time and possibly suffers from frequent errors. Accordingly, the conventional information memorizing means is inconvenient and insufficient.

SUMMARY OF THE INVENTION

Accordingly, an object of the invention is to provide an electronic calculation/memorandum apparatus in which the various information is always stored, and, if necessary, desired information is easily retrieved. Additionally, the electronic calculation/memorandum apparatus may easily change the stored information, and, if necessary, read out the stored information in the order of storing to display them. Furthermore, the electronic calculation/memorandum apparatus may have the function of an ordinary desc-top type calculator.

The desc-top type electronic calculator now prevailingly used has a calculation function for performing an arithmetic operation of the numerical data in the order of at most eight to twelve digits, to see the intermediate result of the calculation, and to obtain the grand total, but has not a function for storing characters, numerals and like. The electronic calculation/memorandum apparatus according to the invention has a function for inputting characters and symbols as well as numerical data thereinto and, if necessary, for storing the inputted data, in addition to the numerical data obtained by the arithmetic operation of the conventional desc-top type calculator. In the electronic calculation/memorandum apparatus of the invention, character and symbol such as alphabet are used as an index. The index and its related numerical data as well are keyed into the apparatus. The inputted index and numerical data are stored as a data unit. A power supply to the memory portion is continuously performed to need no exchange of battery at least for one year. A plurality of alphabet characters, for example, as the index are continuously key-iputted to retrieve the numerical data corresponding to the inputted index and to display it. The numerical data for calculation and various other numerical data desired to be memorized are always stored and all the data stored may be successively read out by actuating specified keys. When the index is inputted, the desired numerical data may immediately be displayed. The apparatus of the invention has at least the function of an ordinary desc-top type calculator such as the four-rule arithmetic operation.

BRIEF DESCRIPTION OF THE DRAWINGS

FIG. 8 shows waveforms of timing signals for explaining the operation of the circuit of FIG. 7;

FIG. 10 shows a schematic block diagram of a randam access memory (RAM) provided in the control unit and used as a temporarily memory;

FIG. 11 shows a schematic block diagram of an accumulator used in the arithmetic logic unit (ALU) shown in FIG. 6;

FIG. 12A shows a schematic block diagram of a general register (GR) used as a display register in the ALU of FIG. 6;

FIG. 12B shows a port of the GR for showing the contents stored in the part of the GR;

FIG. 13 shows a block diagram of a main memory (MM) provided in the memory shown in FIG. 6;

FIG. 16 is one example of a display showing a person's name used as an index data;

FIGS. 18A, 18B show a displayed numerical data during the write-in operation shown in FIG. 17;

DESCRIPTION OF THE PREFERRED EMBODIMENTS

Figure 1:
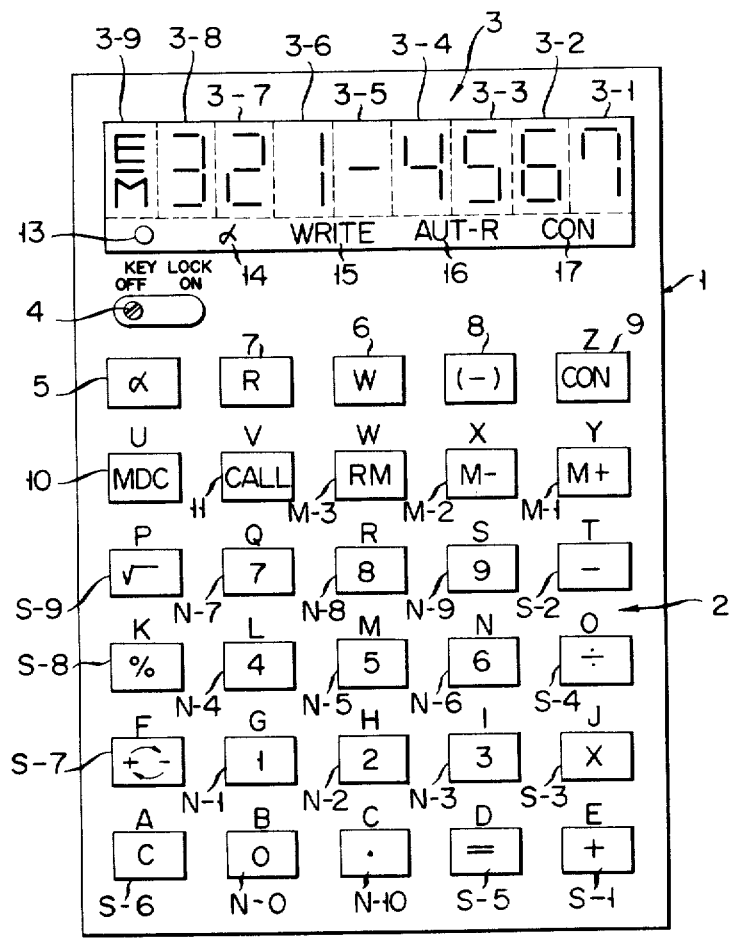
FIG. 1 shows a plan view of an embodiment of a portable type electronic calculation/memorandum apparatus according to the invention, from which a display section and a keyboard section are observed.

As shown in FIG. 1, a keyboard section 2, a display section 3 and a key lock switch 4 are provided on the upper surface of a case 1 of an electronic calculation/memorandum apparatus according to the invention. Keys arranged on the keyboard section 2 are ten numerical keys "0" to "9" and a decimal point key ".", these keys being denoted as N-0 to N-10, three memory control keys "M+", "M−" and "RM", denoted as M-1 to M-3, and nine calculation instruction keys, i.e. symbol keys, "+", "−", "x", "÷", "=", "C", "+−", "%" and "√", denoted as S-1 to S-9.

The keyboard section 2 further includes an alphabetical letter selection key (αkey) 5, a data write-in key (W key) 6, a data read-out key (R key) 7, a hyphen key ((−) key) 8, a data continuous key (CON key) 9, a memory data clear key (MDC) key) 10, and a data call key (CALL key) 11. 26 keys other than the "α" key 5, the "W" key 6, the "R" key 7, and the "(−)" key 8 are double function keys which can input "A" to "Z" into the apparatus in a letter input mode. The letter input mode is set up and released by the actuation of the "α" key 5. In an calculation mode, when the "α" key is depressed one time, the calculation mode is changed to the letter input mode (referred to as "α" mode), and when "C" key S-6 is depressed, the letter A is inputted and at the same time is displayed in the display section 3. In the "α" mode, when the "α" key 5 is depressed another one time, the "α" mode is released to return to the calculation mode. The release of the "α" mode may automatically be done by depressing the "W" key 6 or the "R" key 7 after inputting the alphabet letter in the "α" mode.

Liquid crystal displays 3-1 to 3-9 of nine digits are disposed in the display section 3. Under the displays, there are further disposed a battery indicator 13, an "α" mode indicator 14, a write (WRITE) mode indicator 15, an automatic read-out (AUT-R) mode indicator 16 and a data continuous (CON) mode indicator 17. The battery indicator 13 indicates a state of the consumption of a battery, the "α" mode indicator 14 is lit when the "α" key 5 is depressed to indicate the apparatus is set to the "α" mode, and goes out when the "α" mode is released. The WRITE mode indicator 15 is lit when the W key 6 is depressed after the alphabet letter is inputted in the "α" mode, to indicate the present mode is in the WRITE mode. The indicator 15 goes out when the W key 6 is depressed after the numerical data is inputted following the WRITE mode indication, AUT-R mode indicator 16 lights when the R key 7 is depressed just after the depression of the "α" key 5, to indicate the present mode is in the automatic read-out mode. The depression of the key other than the R key or CON key releases this mode so that the indicator 16 goes out. The CON mode indicator 17 lights up in response to the depression of the CON key 9 when the numerical data is loaded in the "α" mode and when the upper digit of the numerical data extended in the read-out information (in case where the numerical data has eight digit or more, the upper digit indicates the nine digit or more). The lighting of the CON mode indicator indicates the extended numerical data are stored.

Figure 2:
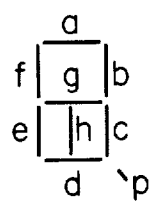
FIGS. 2 and 3 illustrate arrangement of segment electrodes in each digit in the display section.
Figure 3:
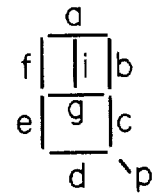
Figure 4:
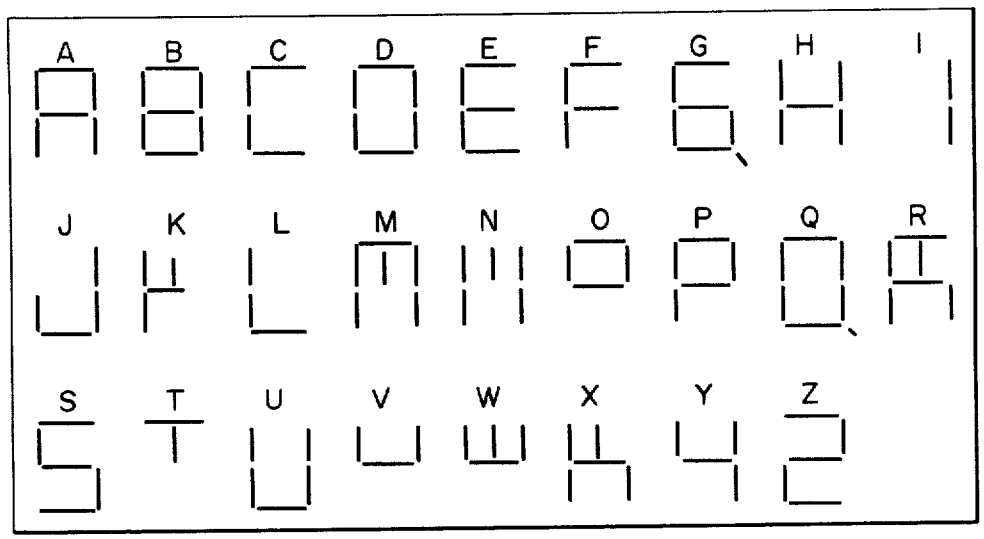
FIGS. 4 and 5 show the relationships between alphabetical letters and the corresponding ones used in the display sections.
Figure 5:
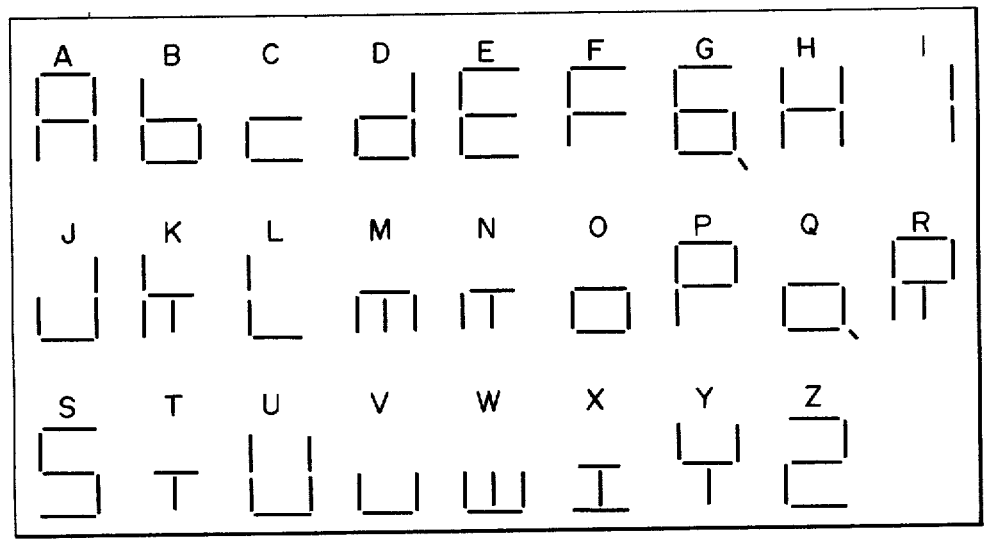

The liquid crystal displays 3-1 to 3-8 are used to display characters or numerals. Each of the displays is illustrated in detail in FIG. 2. As shown, each display is comprised of segment electrodes a to g and a decimal point segment p, and a vertical segment h disposed equally distant from and in parallel with the segments e and c. An alternation of the display shown in FIG. 2 is shown in FIG. 3. In this example, a vertical segment i may be disposed centrally between the in parallel with the segments f and b. FIG. 4 shows alphabetical representations when the display shown in FIG. 2 are used for the displays 3-1 to 3-8. FIG. 5 shows alphabetical representations when the display in FIG. 3 is used for these displays 3-1 to 3-8. The numerical representations by the displays in FIGS. 2 and 3 are the same as the conventional ones so that the illustration of them will be omitted. The remaining display 3-9 is a sign display for displaying an error, minus, memory and the like.

Figure 6:
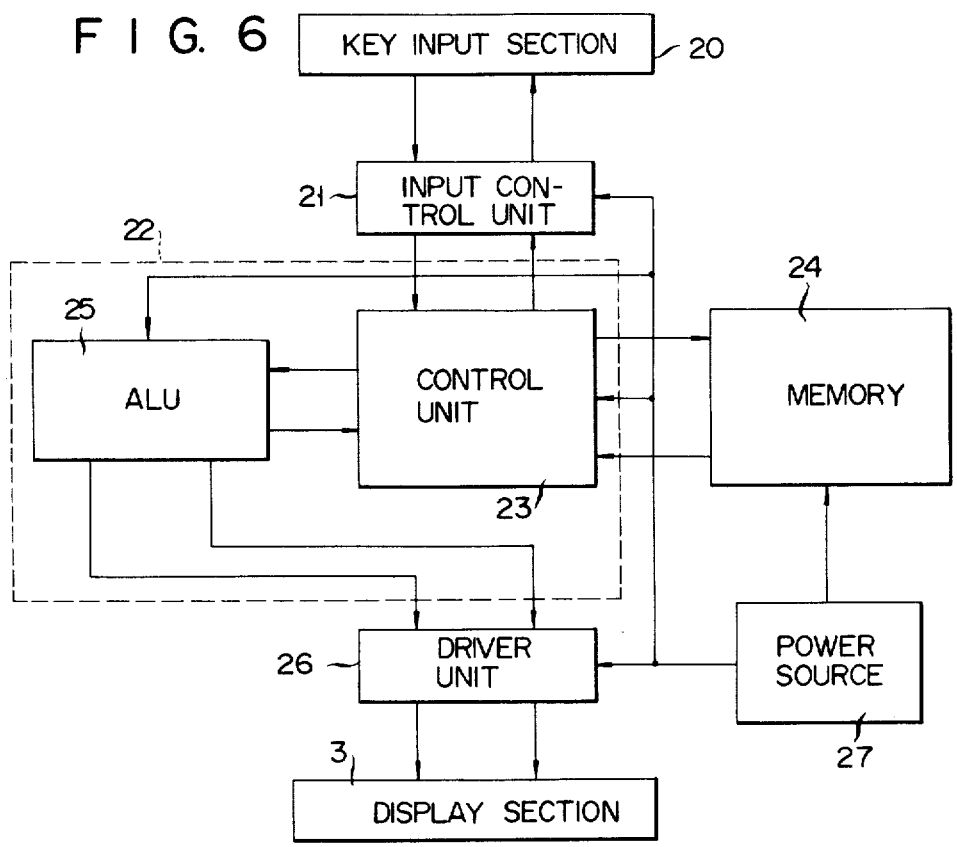
FIG. 6 is a schematic block diagram of an electronic calculation/memorandum apparatus of the invention.

Turning now to FIG. 6, there is shown a block diagram of a portable electronic calculation/memorandum apparatus according to the invention. Various data inputted from a key input section 20 including a keyboard section 2 is transferred to a control unit 23 in a central processing unit (CPU) 22 under control of an input control unit 21. The control unit 23 distributes the received data to a memory 24 or an arithmetic and logic unit 25 in accordance with the kind of the key depressed on the keyboard section 2. The arithmetic logic unit (ALU) 25 properly processes the data distributed. The result of the calculation in the ALU 25 is delivered through a driver unit 26 to a display section 3 where it is visualized. A battery power source 27 supplies a DC power to the input control unit 21, the CPU 22, the memory 24 and the driver unit 26. The memory 24 may be constructed by a random access memory (RAM) of a complementarymetal-oxide-semiconductor (CMOS) with little power consumption. A metal-nitrogen-oxide-semiconductor (MNOS) memory or a programmable read-only-memory (PROM) may be used for the memory 24. The reason for this is that a power supply to the memory 24 must continue in order to keep the data stored in the memory. In this sense, the use of a non-volatile memory for the memory 24 is proposable. However, this type memory is improper because it is relatively difficult to erase the memory. A large scale integrated (LSI) circuit of CMOS type with little amount of power consumption is preferable for the arithmetic and logic unit 25, although the circuit components are not necessarily limited to such. The battery 27 constantly supplies an electric power to only the memory 24 but the electric power is supplied to the other parts only when the apparatus is operated. When the key operation is not continuously performed for more than two minutes or more, the power supply to it is automatically stopped, because the display section most consumes the electric power. This circuit construction enables the same battery to keep the data stored in the memory 24 for one year or more.

The operation of the embodiment thus far described will be given along with operations of the respective keys on the keyboard.

In use, so long as those keys are not used, "α" key 5, W key 6, R key 7, (−) key 8, CON key 9, MDC key 10 and CALL key 11, the apparatus of the invention is operable like the conventional desc-top type electronic calculator. Accordingly, the apparatus of the invention may perform at least the arithmetic operation without any restriction and the explanation relating to this will be omitted.

The operation to follow is the writing operation of a data unit including alphabetical characters and the numerals associated therewith, reading operation of the numerical data with an index of the alphabetical characters stored, erasing and modification of the data once stored, the writing operation of the result of calculation, and the like.

The writing operation of the data will first be given. The amount of the data storable in this example is 30 data units at maximum, each unit being a combination of alphabetical characters less than six characters and numerals less than eight digits. When the CON key 9 is used, the numerals up to fifteen digits may be stored.

Figure 7:
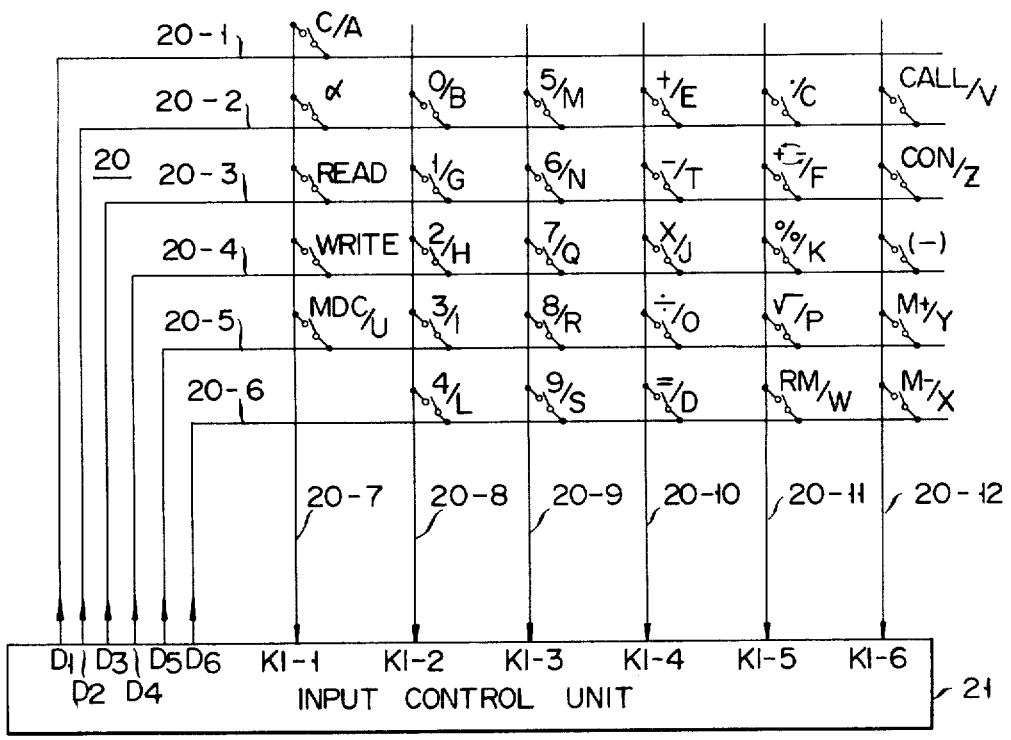
FIG. 7 shows a detailed connection diagram of one example of the key input section shown in FIG. 6.

Let us consider a case to memorize Mr. Fukuda's phone number 321-4567 into the apparatus. The "α" key 5 is pressed to set the apparatus to the "α" mode. This mode permits 26 alphabetical characters to be key-inputted in the apparatus, by the actuation of the corresponding keys. This key function is the second function of the key input section 20. One form of the key input section 20 is illustrated in FIG. 7. As shown, the key input section 20 is formed by a matrix with six row lines 20-1 to 20-6 connected to output terminals D1 to D6 for timing signals of the input control unit 21 and with six column lines 20-7 to 20-12 connected to the input terminals KI-1 to KI-6 for key signals of the input control unit 21. The respective keys N-0 to N-10, S-1 to S-9, 5 to 11, and M-1 to M-3 are provided at the respective cross points of the matrix. The timing signals D1 to D6 are schematically illustrated in FIG. 8 and have different phases, as shown. For example, when the C key S-6 is pressed, only the timing signal D1 is transferred to the row line 20-7 which in turn is introduced from the input terminal of the key signal KI-1 into the input control unit 21.

Figure 9:
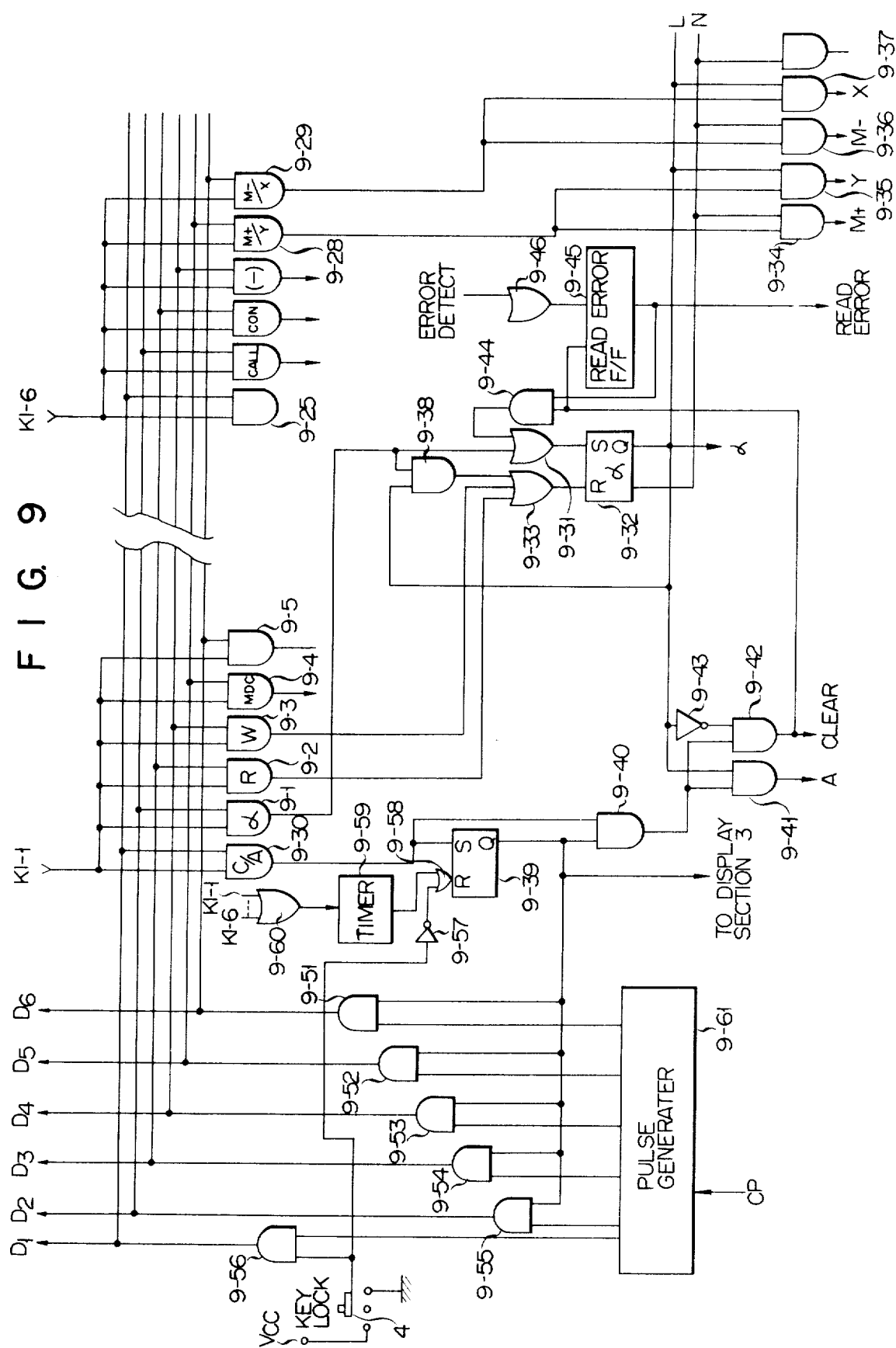
FIG. 9 shows a detailed circuit diagram of one example of the input control unit shown in FIG. 6.

FIG. 9 shows one form of the input control unit 21. The key signal KI-1 introduced from the input terminal of the key signal KI-1 and the timing signal D2 are applied to an AND gate 9-1. Upon receipt of these signals, the AND gate 9-1 is enabled to permit the key signal KI-1 to pass therethrough to reach an OR gate 9-31. Passed through the OR gate 9-31, the key signal KI-1 reaches the set terminal of an R-S flip-flop 9-32 to set the flip-flop 9-32. The flip-flop 9-32 is used for setting up "α" mode. The set output signal of the flip-flop 9-32 is transferred as "α" mode signal to the control unit 23 of the CPU 22. See FIG. 6. With respect to all other key input signals, the timing signal D1 to D6 and the key input signals KI-1 to KI-6 are logically multiplied by the corresponding AND gates 9-2 to 9-29, respectively, so that those key input signals are separately inputted into the control unit 23. When the W key 6 and the R key 7 are depressed, the AND gates 9-3 and 9-2 produce output signals which in turn go through an OR gate 9-33 to reach the reset terminal of the flip-flop 9-32. This resets the "α" mode. In the "α" mode upon setting of the flip-flop 9-32, when, for example, the M+ key M-1 and M- key M-2 are depressed, the key signal KI-6 is applied to one of the input terminals of each AND gate 9-28 and 9-29. At this time, application of the timing signals D5 and D6 enable AND gates 9-28 and 9-29 to permit the KI-6 signal to pass therethrough to reach one of the input terminals of each AND gate 9-34 to 9-37. In the "α" mode, since the flip-flop 9-32 is set, its Q output signal enables the AND gates 9-35 and 9-37 so that the output signals of the AND gates 9-28 and 9-29 are transferred as the alphabets Y and X to the control unit 32, through the AND gates 9-35 and 9-37. The output signal from the AND gate 9-1 is applied, together with the Q output of the flip-flop 9-32, to the OR gate 9-33 through the AND gate 9-38. Therefore, in the "α" mode, when the "α" key 5 is depressed again or the R key 7 or the W key 6 is depressed, the flip-flop 9-32 is reset to release the "α" mode. At the releasing of the "α" mode, when the keys M-1 or M-2 is depressed, the output signals from the AND gates 9-28 and 9-29 are transferred as the memory control signals M+ and M− to the control unit 23, through the AND gates 9-34 and 9-36, because the AND gates 9-34 and 9-36 are enabled at this time. The key S-6 is used for clear, error clear and for inputting the alphabet A. When the C key S-6 is depressed in the "α" mode, the key signal KI-1 outputted from the AND gate 9-30 at the timing of the D1 is sent to the set terminal of the flip-flop 9-39 and at the same time to one of the input terminals of the AND gate 9-40. The Q output from the set terminal of the flip-flop 39 is inputted to the other input of the AND gate 9-40. The output signal from the AND gate 9-40 is inputted to one of the terminals of each AND gate 9-41 and 9-42. In the "α" mode, the AND gate 9-41 is in enabling condition due to the Q output from the set terminal of the flip-flop 9-32. Therefore, the AND gate 9-41 sends the key signal KI-1 as an alphabet A signal to the control section 23. At the releasing of the "α" mode, the output signal from the inverter 9-43 enables the AND gate 9-42 so that the clear signal is transferred from the AND gate 9-42 to the control unit 23 and also to one of the input terminals of the AND gate 9-44 and the reset terminal of the flip-flop 9-45. In the error detection, the error detection signal is applied from the OR gate 9-46 to the set terminal of the flip-flop 9-45. The set output signal of the flip-flop 9-45 is then applied to the other input terminal of the AND gate 9-44. When the memory 24 has not the index coinciding with the index inputted when the R key 7 is depressed, the apparatus produces an error detection signal. Under the error detection condition, when the C key S-6 is depressed, the output signal of the AND gate 9-44 is applied through the OR gate 9-31 to the set input terminal of the flip-flop 9-32. The result is that the apparatus is again set to the "α" mode to permit a correct index to be inputted thereinto.

When the C key S-6 is depressed to set the flip-flop 9-39, the set output signal is transferred as an ON signal to the power source for the display section 3 and to one of the input terminals of each AND gate 9-51 to 9-55. The timing signals D2 to D6 are applied from a pulse generator 9-61 controlled by the clock pulse CP to the other input terminals of the AND gates 9-51 to 9-55. Thus, it will be seen that the timing signals D2 to D6 are outputted only when the C key S-6 is inputted. The timing signal D1 is obtained when the power voltage Vcc enables the AND gate 9-56 in response to the turning-on of the switch 4 (FIG. 1) operating as a key lock signal. Accordingly, the timing signals D2 to D6 are not produced until the key lock switch 4 is turned on and the timing signal D1 enables the AND gate 9-30. When the key lock switch 4 is turned off, even if any one of the keys is depressed, nothing is displayed by the display section 3 and no key input signal is inputted to the control unit 23. When the key lock switch 4 is turned off, the signal inverted by an inverter 9-57 is applied to the OR gate 9-58 and the output of the OR gate 9-58 resets the flip-flop 9-39 thereby to inhibit all the timing signals D1 to D6. Even when the key lock switch 4 is turned ON, if the output signal from a timer 9-59 including a retriggerable flip-flop resets the flip-flop 9-39 through an OR gate 9-58, the timing signals D1 to D6 similarly are inhibited. When the OR gate 9-60 receives any one of the key signals KI-1 to KI-6, the timer 9-59 produces no output signal. When any one of the keys is not actuated for two minutes or more and the OR gate 9-60 produces no output signal to the timer 9-59 for two minutes or more, the timer 9-59 is set to send a reset signal to the flip-flop 39 through the OR gate 9-58. In this manner, even when the switch 4 is turned ON, if none of the keys is actuated for two minutes or more, the timer 9-59 operates to reset the flip-flop 9-39 to stop the display of the display section 3. Accordingly, power consumption of the battery is remarkably reduced.

In the above-mentioned example, the key signal inputting is inhibited by using the AND gates 9-51 to 9-56; however, power is further saved if means to stop the operation of the pulse generator 9-61 is employed for the inhibition.

Various data passed through the above-mentioned key input unit 20 and the input control unit 21, are temporarily stored in a random access memory (RAM) within the control section 23. As shown in FIG. 10 illustrating the memory map of the RAM, the RAM is constructed by 6 bits×24 words. The first six words (RM0 to RM5) are used for temporarily storing alphabet characters. The data of alphabet characters key-inputted in the "α" mode are temporarily stored in the area. The memory area of 8 words (RM6 to RM13) following this is used for temporarily storing the numeral data of the upper digits than the eight digits when the CON key 9, i.e. the extension key of numerical data, is used. The eight words (RM14 to RM21) following this are used for temporarily storing displayed numerals (up to eight digits at maximum) when the "α" key 5 is depressed during the numerical display. The memory area (RM14 to RM21) also stores the calculated result when the result is memorized in the main memory MM with the index data after the apparatus is used as a desctop type calculator. The area of two words (RM22 and RM23) stores the address of the coincident data when a subroutine to compare the data in a general register with that in a main memory to be described later, used. Incidentally, when the apparatus is used as an ordinary desc-top calculator, only the lower four bits of each word RM0 to RM23 are used as three registers each storing eight words (four bits for each word).

The control unit 23 is further provided with a general register GR as shown in FIG. 11. The general register GR is constructed by 6 bits×10 words and the respective words being denoted as GR0 to GR9, as shown in FIG. 12A. The eight registers GR0 to GR7 serve as display registers; the register GR0 for the most significant digit 3-8 in the display section 3 in FIG. 1, the register GR7 for the least significant digit 3-1. The remaining registers GR8 and GR9 set the operation modes designated by the symbols attached to the respective bit blocks of the registers GR8 and GR9, as shown in FIG. 12B. In FIG. 12B, "—" designates a minus of the arithmetic operation results mode; "M" a memory mode; "E" an error mode; "COIN" a flag mode for indicating if coincident data is detected or not through the subroutine execution; "R" a read mode; "CALL" a mode for indicating if the call key is depressed or not immediately before. In the register GR9, "C" designates a mode for indicating if the clear key is depressed or not immediately before; "α" a "α" mode; "L" a mode for indicating if the letter is inputted immediately before; "AR" an auto read mode; "W" a write mode; "CON" a mode for indicating the "CON" key is depressed or not.

Figure 14:
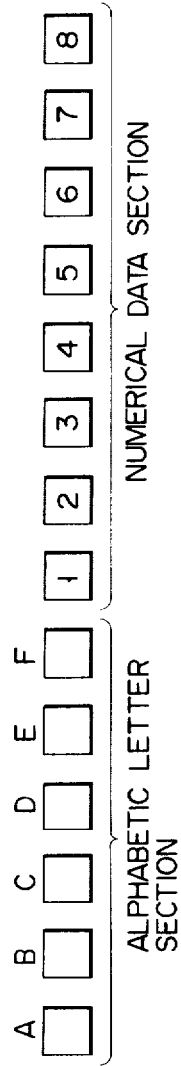
FIG. 14 shows the construction of a data unit keyed into the memory of FIG. 6.
Figure 15:
FIG. 15 shows the ordinary write-in operation to store a data unit in which a hyplan (-) key is operated to show a telephon number as the numerical data.
Figure 17:
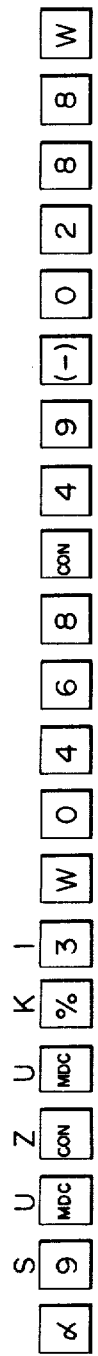
FIG. 17 shows another write-in operation to store an expanded numerical data into the memory.

Turning now to FIG. 13, there is shown a memory map of a main memory MM in the memory 24. The first six words area (MM0 to MM5) stores the index data α1 of 6 bits×6 words. The following eight words area (MM6 to MM13) stores the numerical data N1 of 6 bits×8 words. The succeeding area MM14 to MM19 stores the second index data α2. The next memory area MM20 to MM27 is used for storing the second numerical data N2. In this manner, the 30th index data α30 are stored in the memory area MM406 to MM411; the 30th numerical data N30 in the memory area MM412 to MM411. Thus, the memory capacity of the main memory MM is 420 words×6 bits=2520 bits. In the other words, the MM can store up to 30 data units each being a combination of the index of six digits and its related 8-digits numerical data. The data inputted from the key input section 20 through the input control unit 21 is successively loaded into the main memory MM from the first memory location MM0 to the last one MM419, under control of the control unit 23 in FIG. 1. The information unit including, for example, alphabetical letters ABCDEF and numerical data 12345678 has a format as shown in FIG. 14. The information format of the "Mr. Fukuda's phone number" is "FUKUDA 321-4567". The key operation for inputting the information format is as shown in FIG. 15. In the figure, the leftmost end indicates the first key operation and the rightmost one the last key operation.

The "α" key 5 is first depressed. The depression produces a key signal. The key signal goes to the set terminal of the flip-flop 9-32 in FIG. 9, to place the apparatus to be in the "α" mode. This mode permits 26 alphabet letters to be inputted thereinto. The key operation of this case belongs to the second function of the respective keys on the keyboard 2. The "α" mode is released by depressing the "α" key 5 again. Upon the releasing of the "α" mode, the apparatus mode transfers to an ordinary key function mode. Incidentally, when the "α" key is depressed and the apparatus is in the "α" mode, the symbol display portion 14 in the display section 3 displays to indicate the apparatus is now in the "α" mode. When α mode is established, the control unit 23 drives the symbol display portion 14 in the display 3 to display the α mode and also to display the remaining number of the data units which can be stored in main memory. Thus, the control unit 23 has a counter for counting the number of the remaining addresses to be stored with the remaining data units. Maximum number (30 units, in this example) of data units to be stored in the memory 24 is set in the counter and, each time a data unit consisting of alphabetic letters and numerical data is written (stored) into the memory section (24), the contents of the remaining number counter are subtracted one. The control unit 23 operates to display the contents of the remaining number counter on the display 3 each time the α key 5 is depressed. Accordingly, in this embodiment, the numeral "30" is displayed if no data is stored in the memory 24. In this manner, it is possible to know instantly the number of data units capable of storing in the memory 24. When numerical data is displayed in the calculation for the ordinary arithmetic operation, if the key 5 is depressed, the numerical information stored in the display register GR (FIG. 11) on the arithmetic and logic unit 25 is transferred to registers RM14 to RM21 for temporarily storing numeral data (referred to as numerical registers) in the control unit 23 (see FIG. 10), to erase the display of the numeric data. Accordingly, for example, when the amount of money deposited in a bank and the name of the bank are memorized, and the result of calculation in making a deposit in or drawing money from the bank is memorized again, the calculation result may be memorized by a key actuation without writing it on a paper.

After depression of the "α" key 5, the keys are depressed FUKUDA, i.e. + −, MDC, %, MDC, =, C so that the second name "FUKUDA" is inputted as an index into the apparatus. The inputted alphabetical letters, respectively, are converted into six bit code signals (FIG. 23) by the input control unit 21 and the converted ones are successively applied to the control unit 23. At this time, the alphabetical letters inputted are transferred from the control unit 23 to the driver unit 26, too, through the display registers GR0 to GR7 in the arithetic and logic unit 25. As a result, the respective alphabetical letters are displayed by the displays 3-3 to 3-8 in the display section 3, in the character forms as shown in FIG. 4. That is, the "FUKUDA" inputted is displayed as shown in FIG. 16. The alphabetical letters are successively displayed from left (the most significant digit) to right (the least significant digit) end display in the display section. Called "left justify" display method is employed in this example. Following the inputting of the alphabetical letters as an index, the W key is depressed to produce a key input signal which is in turn applied to the control unit 23, with the result that the apparatus is set to the write mode. The control section 23 then converts the alphabetical letters into the corresponding coded signals which are temporarily stored in the registers RM0 to RM5 (FIG. 10) in the control unit 23 while at the same time lights the symbol display 15 in the display section 3 to display the apparatus is now in the write mode. When the W key is depressed, the "α" mode is released. Therefore, the succeeding numerical data are permitted to be inputted into the apparatus.

Thus, after depression of the W key 6, the input keys are actuated 321 (-) 4567 so that the phone number of eight digits is inputted. The inputted numerals are converted into six-bits code signal, respectively, by the input control unit 21 and these code signals are successively supplied to the control unit 23. At this time, the numerical data also is applied to the drive unit 26, through the display registers GR0 to GR7. As a result, the numerical data the phone number of Mr. Fukuda are displayed at the displays 3-1 to 3-8 in the display section 3, as shown in FIG. 1. In this case, the numerical display depends on the called "right justify" method. That is, the numerical data is displayed from right (the least significant digit) to the left (the most significant digit) in the display section. After the completion of the numerical information inputting, the W key is again depressed. The signal produced by the W key depression is supplied as a write instruction to the control unit 23. Through this operation, the control unit 23 reads out the alphabetical letters "FUKUDA" temporarily stored in the letter registers RM0 to RM5 and loads the read out ones into the index part α1 (alphabetical letter part) of the main memory MM in the memory 24 while at the same time loads the coded numerical data "321-4567" into the information part (numerical part) N1 corresponding to the index part. In this manner, the alphabetical letters for the index and the numerical data associated therewith are loaded as an information unit into the memory 24. At this time, the W key 6 is depressed again (two times) so that the write mode set up by the first (first time) depression of the W key 6 is released by the control unit 23. Accordingly, the symbol display 15 in the display section 3 is erased to return the apparatus to the initial mode (calculation mode).

In this manner, with repeat of the above-mentioned operation, alphabetical letters (for example, name) less than six letters for the index and the associated numerical data (for example, phone number) less than eight digits may be loaded as an information unit into the memory 24, so long as its memory capacity permits.

The (−) key 8 is used for inserting a hyphen (-) into the alphabetical letters and/or the numerical data. When the (−) key is actuated in the course of the inputting the alphabetical letters or the numerical data, the hyphen (-) is inputted together with the letters and numerals, for example, K-KISI 456-3528. In this case, the numerical data including the hyphen can not be used for calculation. If it should be used, an error is displayed at the symbol display part 3-9 in the display section 3. Data loaded into the information part of the memory 24 includes hyphen, decimal point, positive and negative symbols, zero before numerals (for example, 0 of the numeral 045).

Further, when the numerical data exceeds eight digits, if the CON key 9 is depressed, the numerals up to fifteen digits may extendedly be inputted. For example, when Mr. Suzuki's phone number "(0468) 49-0288" is memorized, keys are operated as shown in FIG. 7. The digits of the phone number exceeds eight digits. Therefore, the CON key 9 is depressed in the course of the inputting of numerals. This must be made within eight digits. The key input signal produced by the depression of the CON key 9 is supplied to the control unit 23. Upon receipt of the key input signal, the control unit judges the extension of data to take place. On the basis of the judgement, the control unit 23 temporarily loads the numerals "0468" inputted before the CON key 9 is depressed into the RM6 through RM13, and loads together with the numerical data the numerals "49-0288" inputted after the CON key 9 is depressed into the memory 24. In this case, the index part corresponding to the next information part storing the extended numerals can not be used. In the case of the numerical extension, the memory 24 uses the memory area corresponding to two information units for one information unit. At this time, because of depression of the CON key 9, the control unit 23 activates the symbol display part 17 in the display section 3 to indicate the information is extended. In this case, in place of the indication by the symbol display part 17, one digit at the rightmost end (the least significant digit) 3-1 in the display section 3 may be used with display of C, as shown in FIG. 18A or 18B. Additionally, both the places 17 and 3-1 may also be used for indication of the display extension. The operation of the CON key 9 is effective only for two operations: one is when the numerical data is extended and inputted in the write mode; the other one is when the first half or the second half of the numerical data more than eight digits extended in the reading mode is repeated. In the above-mentioned example, the data extension was described relating to only the numerical data. However, if the memory capacity of the memory 24 allows, the extension of the alphabetical data is possible and further the numerical data may be extended to sixteen digits or more. This is correspondingly applied to the extension of the digit number in the display section 3.

The explanation to follow is the writing operation of the calculation result.

Figure 19A:
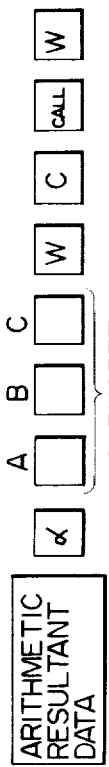
FIGS. 19A, 19B respectively show write-in operations for writing the resultant of the calculation operation.
Figure 19B:

The writing operation has two cases: (a) to write the modified data into the memory location having data already loaded thereinto; (b) to write new data into a new memory location. The key operations for these cases are illustrated in FIGS. 19A and B. The case (a) is, for example, that a deposite is stored with the index of the name of a bank, and the result of the calculation in making a deposite or drawing it is memorized again. In this case, the calculation result of the amount of deposite read out by a reading operation to be described later and a new deposite or a withdrawal is obtained by an ordinary calculation mode. Then, the "α" key is depressed to produce a key input signal. After receiving the key input signal, the control unit 23 transfers the calculation result in the display registers GR0 to GR7 to the numerical registers RM14 to RM21, to erase the display. As described above, the depression of the "α" key 5 causes the apparatus to be in the "α" mode and permits the alphabetical letters to be inputted into the apparatus. Accordingly, the alphabetical letters as an index (here, the name of the bank) are inputted and the W key 6 is depressed. The depression of the W key 6 changes the apparatus mode from the "α" mode to the write mode. And the alphabetical letters inputted are stored in the letter registers. However, the alphabetical letters inputted have been stored in the memory 24 so that the control unit 23 judges that the same index data are inputted. As a result, the symbol display part 3-9 in the display section 3 is activated to indicate an error condition. Here, the clear key, i.e. the C key S-6, is depressed so that the control section 23 releases only the error condition. Following this, depression of the CALL key 11 is conducted to drive the control unit 23 which in turn reads out the result of calculation temporarily stored in the numerical registers RM14 to RM21. Finally, the W key 6 is depressed so that the control unit 23 loads the calculation result read out from the numerical registers RM14 to RM21 into the numerical data part corresponding to the index part of the memory 24 where the same alphabet letters as these stored in the letter registers RM0 to RM5 are stored. In other words, in this case, the numerical data have already been stored in the information part. Accordingly, the contents in the numerical data part is renewed, i.e. changed, by the modified data. That is, this is the case (a).

Let us consider now the case (b) where a calculation is made in an ordinary calculation mode and the calculation result is newly memorized. Since this case is to load data into a new memory location, no error is produced after the W key is first depressed. Therefore, it is not necessary to depress the C key S-6. For this, after the depression of the W key 6, the CALL key 11 is depressed to read out the result of the calculation from the numerical registers RM14 to RM21. Then, the W key is depressed again to read out the alphabetical letters from the letter registers RM0 to RM5 and load them into the index part of the memory 24 while loads the calculation result into the numerical data part corresponding to the index part.

The data in the numerical registers RM14 to RM21 may be read out only when the CALL key 11 is depressed after inputting of the alphabetical letters because it is now in the write mode. The data transfer into the numerical registers RM14 to RM21 is conducted only when the "α" key is activated during the display of the numerals including zero, as mentioned above. Accordingly, its clear is made in such a manner that the numeral "0" is inputted and the "α" key 5 is pushed. That is, in such manner, the "0" is transferred to the numerical registers RM14 to RM21, with the result that the clear is conducted.

Figure 20A:
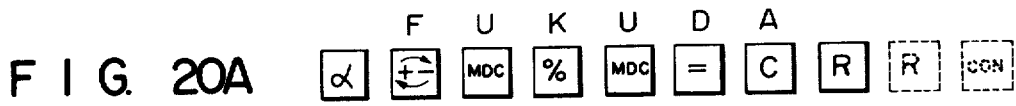
FIGS. 20A, 20B respectively show read-out operations for reading the stored data.
Figure 20B:

The next explanation is the read-out operation (retrieval) of the numerical data stored in the memory 24. The retrieval operation includes two cases: (a) to designate the alphabet letters already stored and to read out the numerical data related to the index; (b) to alternately read out the alphabetical letters and the numerical data successively in the order of the memory address of the memory 24. These two cases are illustrated in FIGS. 20A and B. In the case of (a), the "α" key is first pushed down. Accordingly, the apparatus mode is set to the "α" mode to permit the inputting of alphabetical letters, and the symbol display part 14 in the display section 3 displays. At this stage, the alphabetical letters as the index of the desired numerical data are inputted. For retrieving, for example, the Mr. Fukuda's phone number "321-4567", input keys are pushed F U K U D A, as in the previous case so that the second name "FUKUDA " of six alphabets is inputted as the index to display it in the display section. In this case, the alphabetical letters coded are of cause stored in the display registers GR0 to GR7. The R key 7 is depressed to produce a key input signal which is transferred as a read-out instruction to the control unit 23. Upon receipt of the read-out signal, the control unit 23 successively reads out the alphabetical letters within six letters stored in the respective index memory location of the memory 24 and then transfers them to the arithmetic and logic unit 25. The ALU 25 successively compars incoming data with the contents of the display registers GR0 to GR5. Through the comparing operation, it detects the alphabet letter coincident with the contents of the display registers GR0 to GR5, the control unit 23 reads out the numerical data, i.e. the phone number "321-4567", in the numerical data part corresponding to the index part having the alphabetical letters, i.e. "F U K U D A", and then stores them into the display registers GR0 to GR7. As a result, the display section 3 displays the phone number "321-4567" in place of the letters "FUKUDA". At this time, the depression of the R key 7 releases the "α" mode and returns the mode to its initial mode (calculation mode).

Thus, the alphabet letters within six letters (for example, name) which is the index of the necessary numerical data are inputted and the numerical data (for example, phone number) corresponding to the index inputted are automatically retrieved and displayed in the display section 3.

When an erronous letter or letters are inputted, the comparing operation of the alphabetical letters inputted in the ALU 25 fails to find the coincident of the inputted one with the contents in the display registers and the control unit 23 places the apparatus to be in an error condition, to energize the symbol display part 3-9 of the display section 3 for indicating the error condition. The error condition is released by pushing the key S-6; however, one time pushing of that key can not release the "α" mode. After releasing the error mode, one inputs the correct alphabetical letters into the apparatus by pushing the R key 7. Then, through the similar operation, the corresponding numerical data is displayed. The "α" mode is automatically released by continuous pushing of the "α" key 5 and is changed to the ordinary calculation mode. After displaying the numerical information, the "α" mode is released so that the numerical data may be cleared by depressing the C key S-6 as in the calculation mode. If the numerical data does not include the symbol like the hyphen, the numerical data may be used for calculation.

When the numerical information is the extended one with eight digits or more, upon the depression of the R key 7 after the inputting of the alphabetical letters, the control unit 23 reads out the first information, i.e. the first half numerical data from the memory 24, while at the same time lights the symbol display part 17 in the display section 3 or to display the symbol display part C in the display section 3 as shown in FIG. 18A or B for indicating to that effect. When the R key 7 is again depressed as shown by a broken line in FIG. 20A, the remaining data, i.e. the second numerical data is read out from the memory section 24 and displayed on the display section 3 under the control of the control section 23. Here, when it is desired to see the first numerical data, the CON key 9 is depressed as indicated by a broken line in FIG. 20A so that the control section 23 displays again the first numerical data in the display section 3. The repeat of the numerical data extended to the eight digits or more may be conducted by alternately pushing the R key and the CON key 9. When the numerical data is extended to eight digits or more, the extension symbol or sign is displayed at the time the first numerical data is displayed. Therefore, the R key 7 is pushed again to see the remaining numerical data. When it is desired to again see the first half numerical data, the CON key 9 is pushed.

In the case of the (b), the "α" key is first pushed and, immediately after, the R key 7 is depressed. Successively receiving the key input signals produced by these key pushings, the control unit 23 judges that the automatic read-out is necessary, resulting in the automatic read-out mode. At this time, the control unit 23 designates the first address of the memory 24 and to drive the sign display section 16 for indicating the automatic read-out mode. Then, the R key 7 is repeatedly pushed. Every time that the R key is depressed, the control unit 23 successively reads out the alphabet letters and then the related numerical data from the first address and succeeding addresses and transfers them to the display section 3 for displaying. In the automatic read-out operation, as the reading operation goes to, the final address which has been written, it returns to the first address and continues toward the final address. That is, this reading-out operation will be performed endlessly. In the course of the automatic reading-out operation, if a key other than the R key 7 is pushed, the control unit 23 releases the automatic read-out mode, deenergizes the symbol display section 16 of the display section 3, and returns the apparatus mode to its ordinary calculation mode. In this case, when the numerical key, for example, is depressed, the automatic read-out mode is released and the numerical data corresponding to the key pushed is displayed in the display section 3. When the function key (instruction key) is depressed, the control unit 23 releases the automatic read-out mode when the alphabet letters are displayed, and displays the error symbol in the display section 3. The displayed numerical data can not be used in an arithmetic calculation. When the numerical data is displayed, it releases only the automatic read-out mode but does not clear the displayed contents. When the data read out by the automatic reading-out operation is to be cleared, the C key S-6 is pushed. In this case, the automatic read-out mode is released and the alphabetical letters or the numerical data are cleared. In this case of the automatic read-out operation, the automatic read-out mode is set up by continuously pushing the keys of "α" and R. However, an additional key exclusively used for setting up the automatic read-out mode may be used, instead of using the "α" and R keys.

The clearing operation of the various information will be given. The clearing operation includes those by the "α" key 5, the C key S-6, and the MDC key 10. As described above, the "α" key 5 is used for inputting the alphabetical letter and its releasing is made by repushing the same key, resulting in the display of "O" at the least significant digit place in the display section 3. However, when the key 5 is pushed again after reading out of the numerical data from the memory 24 by using the R key, the calculation mode of the apparatus becomes the "α" mode, and the display at this time is the energization of only the display part 14 of the display section 3. The C key operates such that first time depression of it makes a clear entry and the succeeding (second time) depression makes a clear. When the key S-6 is depressed in the "α" mode, the write mode or the read mode, the operation of it is different between the first and second time depressions, as mentioned above, although it makes an error clear, an information clear or a mode releasing in the respective modes.

Figure 21:
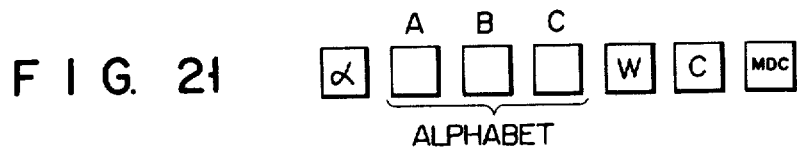
FIG. 21 shows the key operation for explaining the memory data clear (MDC) operation.

The MDC key 10 is used for erasing the information stored in the memory 24, as previously state. The operation of this key is effective only for the write mode, and is ineffective for the "α" mode or the read-out mode. Accordingly, when the information stored in the memory 24 is erased because of its unnecessity or the need of change, the key is operated as shown in FIG. 21. That is, the "α" key is depressed to designate the "α" mode and the index data which referred to the numerical data for erasing or changing are inputted and then the W key is depressed. When the W key 6 is depressed, the mode of the apparatus is changed from the "α" mode to the write mode. As a result, the inputted alphabetical letters are inputted into the letter registers. In this case, however, the alphabetical letters have been stored in the memory 24 so that the control unit 23 places the apparatus in an error condition to drive the symbol display part 3-9 of the display section 3. Under this condition, if the C key S-6 is depressed, only the error condition is removed. Then, the MDC key 10 is pushed. Receiving the key input signal resulting from the actuation of the key 10, the control unit 23 loads all bits "O" into the index area having storing the same alphabetical letters as those temporarily stored in the letter registers, and the numerical data area corresponding thereto in the memory 24. As a result, the information (alphabetical letters and numerical data) stored in the memory areas of the memory 24 are cleared. Thus, for erasing the information stored, the alphabetical letters of the index is designated and the W key is depressed to produce an error condition. Then, only the error condition is removed by the C key S-6 and thereafter the MDC key 10 is depressed. In this manner, the index specified and the related numerical data in the memory 24 are cleared. Accordingly, if the alphabet letters for the index and the numerical data to be newly inputted are loaded as previously stated, the new information may be loaded into the apparatus, that is to say, the data or information exchange may be performed.

In the above-mentioned embodiment, the alphabetical letters are successively displayed from the most significant digit to the least significant digit. The numerical data are successively displayed for the least significant digit to the most significant digit. However, the inverse display method may be applied to the display of them; the left justify display method for the display of the former; the right justify display method for the latter. Unlike the above-mentioned example displaying separately the alphabetical letters and the numerical data, both may be simultaneously displayed, when the number of the digits in the display section is large. In this simultaneous display, those may be arranged in a plurality of rows or in a single row on the same display space. Additionally, the output display means of the invention may be employ a printer in place of the specified display section used in the above example. The apparatus of the invention may be operable as a mere information retreival apparatus, unlike the above-mentioned example having calculator and information retreival functions. Further, the information input section is not necessarily limited to the double key function system.

Figures 22, 23:
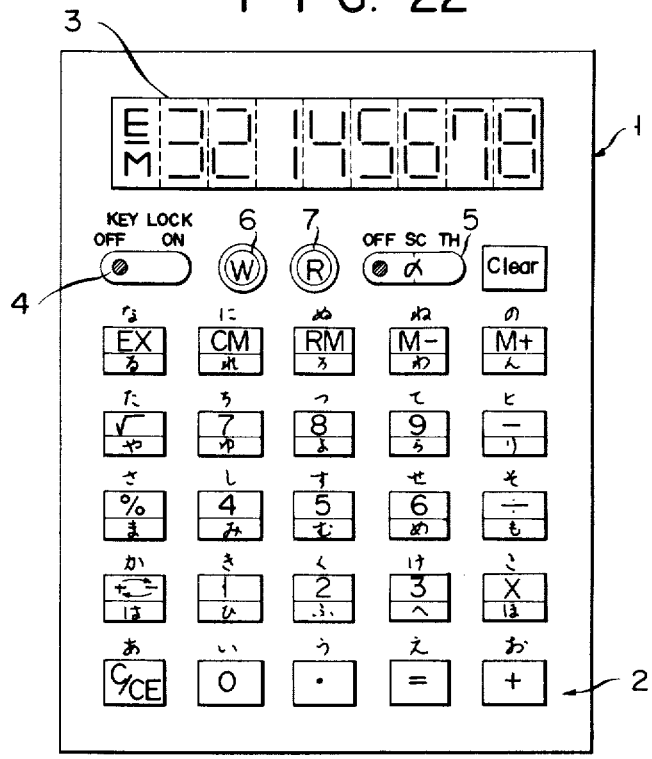
FIG. 22 shows a plan view of another embodiment of the apparatus according to the invention.
FIG. 23 is a table showing 6-bits binary coded data used in the embodiment shown in FIG. 1.

As described above, the apparatus according the invention memorizes various data desired to be memorized and, if one wants to know data, he can quickly retrieve and see it through a proper key actuation. Therefore, the apparatus is very useful when it is applied to a case where the necessary numerical data such as phone numbers, numbers of credit cards, the number of a driving license, the data of birth, addresses and train time tables are memorized and, when necessary, those must be quickly retrieved. Therefore, the apparatus eliminates the need of pocketbook or scratch pads. Furthermore, since a simple key operation enables the necessary information to readily be retrieved. The information retrieval is very quick and correct. Additionally, hiragana (Japanese phonetic symbols) in place of the alphabetical letters may be used for the index letters. This example is shown in FIG. 22. In this case, it is very convenient when the "α" key is constructed by a three-steps key, for example, "OFF-SC-TH". When the "α" key is positioned at the "SC", "あ" to "た" rows may be selected and when it is at the "TH", the selection of "な" to "ら" rows may be selected. Katakana (another Japanese phonetic symbols) may also be used instead of the hiragana.

In the electronic calculation/memorandum apparatus, key input signals inputted from the key board section 2 are all digitally processed by the input control unit (FIG. 6). In the above-mentioned embodiment, all the key input signals are binary-coded to be six-bits binary codes, as shown in FIG. 23. As tabulated in FIG. 23, the respective codes are classified into four groups; 0, 1, 2 and 3. The upper two digits of the bit strings of the codes are used for this classification. For example, numerals 0 to 9 has 00 of the upper two bits and belongs to the group 0. Symbols "√" to "X" has 01 of the upper two bits and belongs to the group 1. The upper two bits of the codes of alphabets A to O are 10 and belongs to the group 2. The upper two bits of the alphabets P to Z and symbols "MDC", "CALL", "CON" and "(−)" are 11 and belongs to the group 3. As previously described, the example employs the double function key method for the keyboard section 1. The upper two digits of the codes are very important to distinguish the two functions, one from another.

The operation of the electronic calculation/memorandum apparatus according to the invention will now be described in detail with reference to FIGS. 24 to 32.

Figure 24:
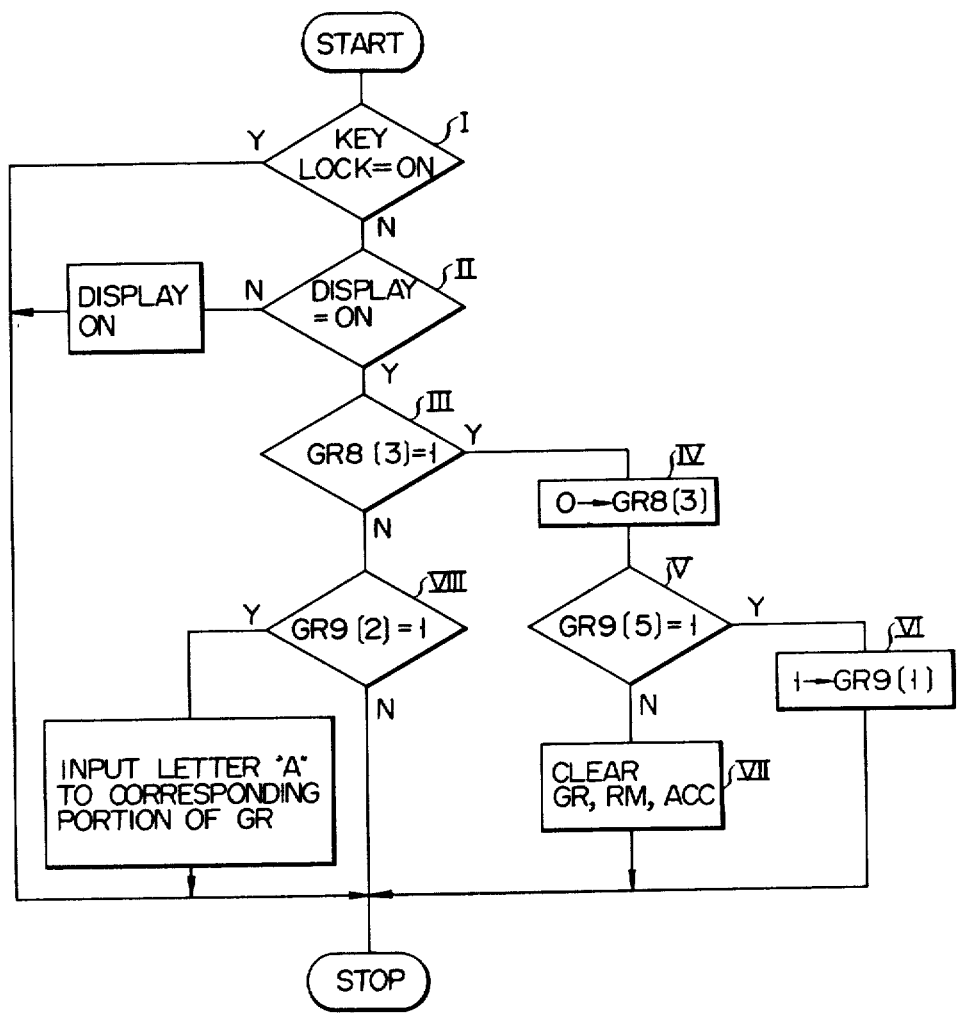
FIGS. 24 to 32 show flow charts for explaining various key operations of the embodiment shown in FIG. 1.

FIG. 24 shows a flow chart illustrating the operation of the clear key S-6. Following START, the first step I checks to see if the key lock (switch 4) is ON or OFF. If the key lock is ON (switch 4 is OFF) proceeds to the STOP, because all the key inputtings is not permitted. When the key lock is OFF (switch 4 is ON), the step proceeds to the step II where, if the display section 3 displays something or not is checked. When it does not display anything, the display is lightened and then the step goes to the STOP. When it displays something, the step proceeds to the next step III. This step checks to see if an error exists or not, depending on the contents of the third bit of the 8th address GR8 of the general register GR in FIG. 12B. When an error exists, the third bit of the GR8 is 1 (hereinafter, this state will be expressed by GR8[3]=1). Then, the step progresses to the next one IV. At this stage, the error state is removed, that is to say, the contents of the third bit of the GR8 is rendered 0, i.e. GR8[3]=0. The step advances to the next step V. Here, the write (W) mode is checked. If the W mode is found, the succeeding step VI renders the bit of the GR9[1] "1" and the clear operation ends, since GR9[5]=1 as shown in FIG. 12B. On the other hand, if the W mode is not found in the step V, an error has occurred in the calculation mode so that the succeeding step clears all of GR, RM and accumulator shown in FIG. 11 and FIGS. 12A and B.

If no error is found in the step III, the step advances to the next step VIII. The step VIII checks to see whether the operation mode of the electronic calculation/memorandum apparatus is the "α" mode. If the operation mode is "α" mode, GR9[2]=1 and the alphabet A corresponding to the clear key S-6 is inputted to the corresponding portion in the general register GR. On the contrary, if it is not the "α" mode, the step proceeds to the STOP.

Figure 25:
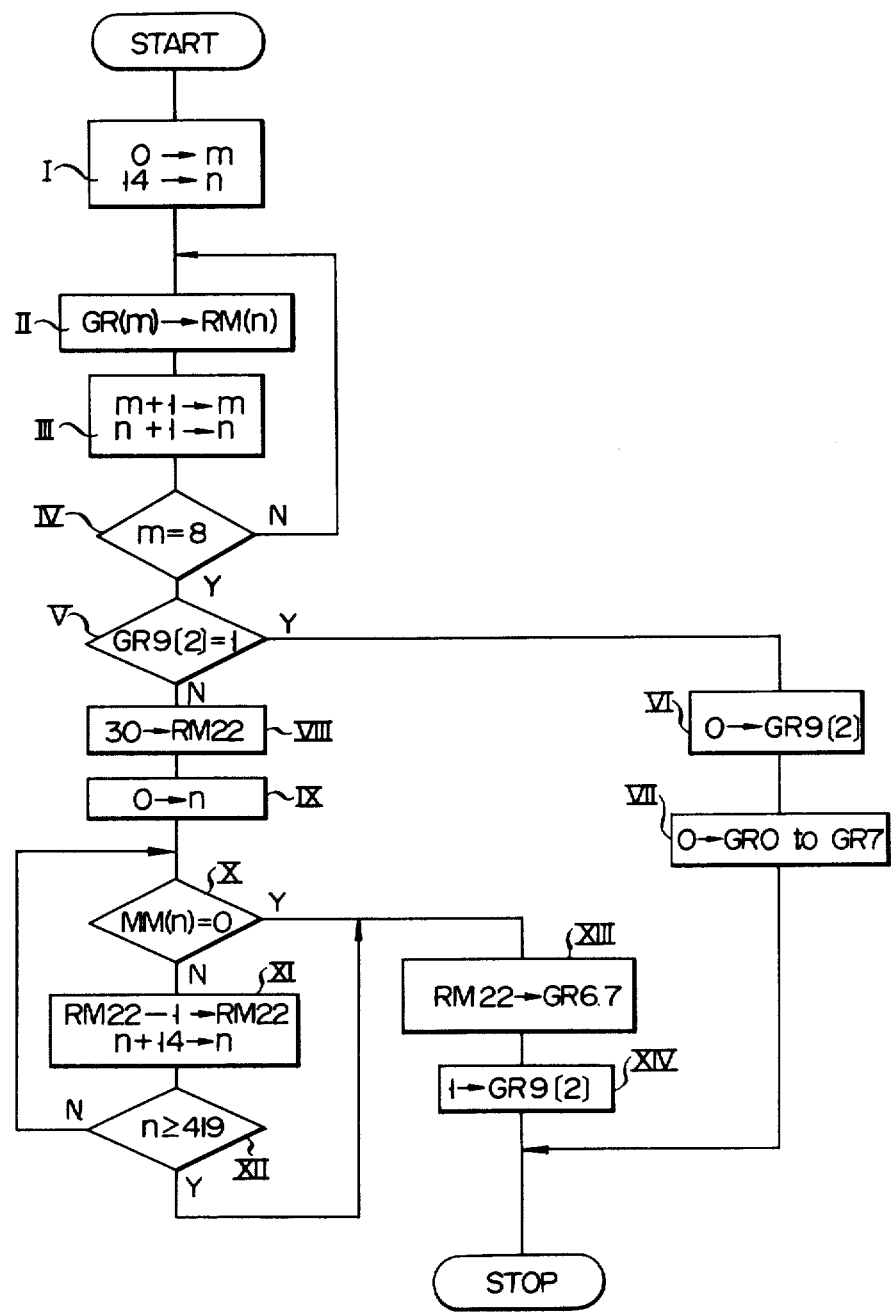

The operation of the apparatus when the "α" is pushed will be described with reference to FIG. 25. When the "α" key 5 is depressed, the step I immediately designates the address 0 of the general register GR shown in FIG. 12A (0→m) and at the same time designates the address 14 of the RM in the RAM in FIG. 10 (14→n). Here, m designates the contents of an address counter of the general register GR and n indicates the contents of an address counter RAM RM. In the step II, the data of the GR0 (m=0) is transferred to the RM14 (n=14). In the step III, the address of the GR and RM are stepped in advance (m+1→m, n+1→n) and then the operation in the step II is repeated. The contents of the address counter of the address n of GR is checked by the next step IV. So long as M<8, the operation returns to the step II so that the same operation will be repeated. When m=8, the data displayed in the GR are all temporarily stored in the memory areas RM14 to RM21.

In the step V, the contents of the GR9[2] is checked so that it is found whether the "α" mode is set up or not. In the "α" mode, since GR9[2]=1, the operation proceeds to the step VI where the "α" mode is removed, and GR9[2] is set to "0". That is, as described above, the first depression of the "α" key 5 sets up the "α" mode and the second time depression of the same releases the "α" mode. As a result, the step VII clears the contents of the general registers GR0 to GR7 to erase the display and then the operation reaches the STOP.

On the other hand, if the step V confirms the apparatus is not in the "α", the step shifts to the step VIII for counting the memory remainder. In this step, the numeral 30 is preset in the memory area RM22. Then, the step IX renders the contents of the address counter of the main memory MM zero (0→n). Under this condition, the X step checks to see if the contents of the address 0 of the main memory M is "0" or not. If the contents is not "0", data has been stored in the address. Accordingly, the step shifts to the XI step where the head address of the next index data portion in the main memory MM is set in the MM address counter (n+14→n) and at the same time 1 is subtracted from the stored numeral 30, i.e. 30−1=29. Generally, this is expressed RM22−1→RM22. In this manner, the contents of the main memory MM is successively checked till the final address MM 419, in the step XII. Until n≧419, the step returns to the step X where a similar check is performed. When n≧419, the operator advances to the next step XIII.

In the course of the execution of the steps X, XI and XII, when any one of the index memory parts α1 to α30 has "0", no data is stored in the memory parts from the "0" including memory part forward. Under this condition, the step XIII transfers the contents (memory remainder) of the GR22 at that time to the GR5 and GR7. The general registers GR6 and GR7 correspond to the lower two digits of the display section 3 in FIG 1. The data of the GR22 is converted into a decimal number which in turn is displayed as a two-digit number in the display parts 3-2 and 3-1. Following the display, the next step XIV loads "1" into the GR9[2]. Incidentally, GR9[2] means the second bits of the general register 9. As a result, the "α" mode is set up, and the operation stops.

Figure 26:
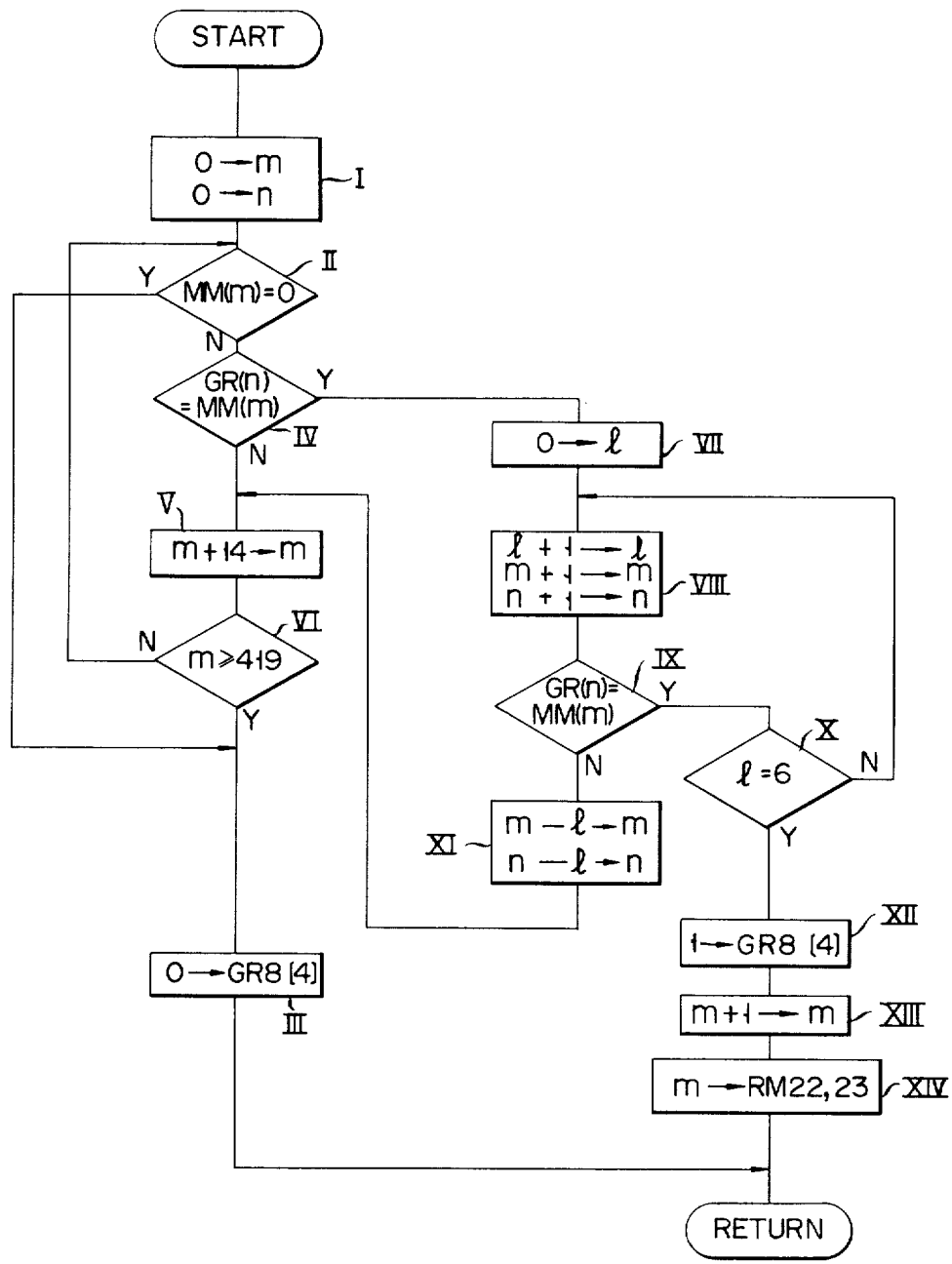

The following description is the operation of comparing the contents of the general register GR in FIG. 12A with the contents of the main memory MM shown in FIG. 13. Reference is made to FIG. 26. This comparing operation will be hereinafter referred to as a subroutine 1 (SUB. 1). As previously described, the subroutine 1 is used to check to see if the same index data as the one newly inputted when data is loaded is stored in the MM or not, to see if the designation index data inputted when data is read out is stored in the MM, and to read out the same index data as the one inputted when the memory data clear key is depressed and the related numerical data, and then to clear them.

In FIG. 26, the step I sets to "0" the contents of the general register GR and the address counter of the main memory MM (0→m, 0→n). The step II checks to see whether the contents (the head letter of the first index data) of the address MM0 of the main memory MM is 0 or not. If the content is 0, the step III detects no coincided index the coincident flag "COIN" in the fourth bit of the GR8 is reset to 0 (0→GR8[4]). Then, the operation returns to the interruption address to the subroutine 1.

When the step II finds the contents of the MM0 is not 0, the contents of the first digit (GR0) of the index data inputted is checked to see whether it coincides with the contents of the MM0, in the step IV. When both are not coincident, the next step V advances the address of the main memory MM by 14, in order to see the head letter of the index data of the following information unit. The reason for this is that one information unit includes six digits for the index data and eight digits for the numerical data. Whether the address of the main memory MM as a result of that exceeds 419 is checked in the next step VI. When it is below 419, the operation returns to the step II where it is checked whether the index part has any data or not. When the result of the check is YES, whether these are coincident or not is similarly checked in the steps II, IV and V. When m≧419, the step shifts to the step III so that the coincident flag "COIN" is reset (0→GR8[4]) and the operation returns to the interruption address to the SUB 1.

When the head letter in the GR0 is included any one of the first digit in the index memory areas α1, α2 . . . α30, the coincident between them is detected in the step IV and the step shifts to the step VII. The steps succeeding to the step VII are used to check to see whether the index letters are coincident or not over all of the six digits. The contents of the coincident counter 1 is first reset to zero. Then, in the step VIII, the coincident counter 1, the address m of the general register GR, and the address n of the main memory MM are advanced by one. Following this, the step IX checks to see if the contents of the address 1, GR1, of the general register GR is coincident with the contents of the address 1, MM1, of the main memory MM. When both contents are coincident, the step X checks to see whether the coincident check was performed till the six digits. When the check is not 1=6, the step returns to the step VIII, and the operation is similarly repeated. When uncoincidence between them is detected in the course of the coincident check operation over six digits, the step IX shifts to the step XI so that the adresses of the general register GR and of the main memory MM return both to the position of the head letter of the index data. For example, when the indexes are coincident till the three digit place and are uncoincident at the four digit place, the contents of the coincident counter 1 is 3 and therefore 3 is subtracted from m and n, respectively (m−3→m, n−3→n). Then, the step shifts to the step V for the index comparing of the next information unit. When coincidence is detected over all of the six digits run in the comparison, the relation 1=6 holds is the step X and the coincident flag is set in the step XII (1→GR8[4]). Subsequently, the contents of the address counter is advanced by "1" (m+1→m) in order to the head address of the numerical data positioned following the last digit of the coincident index in the main memory MM, in the step XIII. In the succeeding step XIV, the head address m of the numerical data corresponding to the coincident index data is set in the addresses 22 and 23 of the RAM RM and the operation is returned to the interruption address to the SUB. 1.

Figure 27:
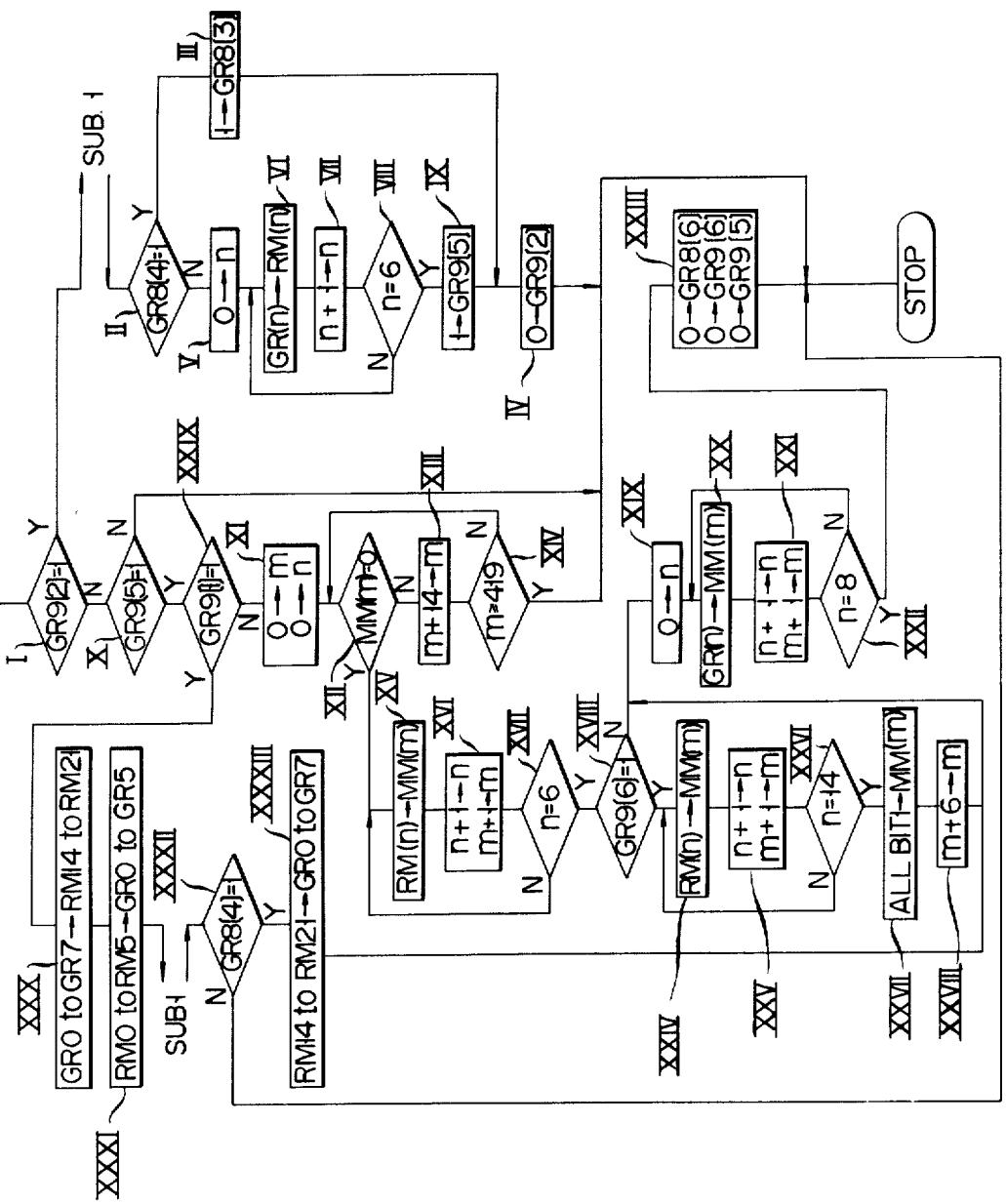

The operation of the apparatus when the W key 6 is depressed will be described with reference to FIG. 27. After START, whether the apparatus mode is the "α38 mode or not is checked through the checking of the bit contents of the GR9[2], in the step I. In the case of the "α" mode, the operation shifts to the subroutine SUB. 1 where the contents of the general register GR is compared with the contents of the main memory MM. The result of the comparison in the subroutine SUB. 1 is checked in the step II. If both are coincident, the step III sets "1" in the GR8[3], resulting in the setting of error state. The step IV renders the bit of the GR9[2] zero to reset the "α" mode and then the operation ends.

When the result of the execution of the SUB. 1 shows that the memory does not store the index data coincident with the index data inputted, the index data of the GR for loading with the numerical data is transferred to the RM. That is, the step II shifts to the step V where the address counter of the RAM and GR is set "0" (0→n). The operation continues until the six index letters in the addresses 0 to five of the general register GR (GR0 to GR5) are all transferred into the addresses 0 to 5 (RM0 to RM5) of the RAM RM. Upon completion of the data transfer, the next step IX loads "1" into the GR9[5], that is to say, the fifth bit of the general register GR9 so that the apparatus is in the write mode, and the operation of the apparatus stops.

The step I detects that the apparatus mode is not the "α" mode. In this case, the step shifts to the step X where whether the fifth bit of the GR9 is 1 or not, that is to say, write mode or not, is checked. When not the write mode, the operation immediately stops. When the write mode, the next step XXIX detects to see whether the clear key has been depressed or not. If it is found that the clear key has not been depressed, the operation proceeds through the steps XI, XII, XIII and XIV to seek the memory location of the main memory permitting data loading thereinto. The operation was referred to relating to the steps I, II, III and VI. When the result of the memory location searching shows that the main memory MM is full of data, the step XIV shifts to STOP.

When the main memory has a room for permitting data loading thereinto, the step XII detects this and advances the next step XV. The steps XV to XVII are used to load the index data into the detected room of the main memory MM. In the step XV, the data in RM0 is stored into the addressed MM(m) of the detected room. In the step XVI, the RM1 and MM(m+1) are designated and the next data is transferred thereinto. This operation is repeated until the step XVII detects the RM5(n=6).

After the data in the RM0 to RM5 are all transferred to the main memory MM, the step XVIII checks to see if the GR9[6] is 1 or not, that is to say, the CON key 9 has been depressed or not. When it has not in the CON mode, the steps XIX, XX, XXI and XXII successively loads the numerical data stored in the GR0 to GR7 into the main memory from the address succeeding to that having the index loaded thereinto to the subsequent ones. In the step XIX, the contents n of the address counter of the general register is set to "0". Then, the numeral in the GR0 is stored into the address portion m of the main memory MM. In the step XXI, the addresses of the GR and MM are advnaced each by one step and the numeral in the GR1 is loaded into the MM(M+1). In this manner, the numeral in the 8th digit of the GR7 is transferred to the MM. It is detected that the numerals transfer are completed in the step XXII. Then, the step XXII proceeds to the step XXIII. At this stage, GR8[6], GR9[6] and GR9[5] are set to "0" in order to reset the CALL mode, CON mode and write mode.

When the step XVIII detects that the operation is in the CON mode, the steps XXIV, XXV and XXVI will execute. And as a result, the numerical data stored in the RM6 to RM13 is stored into the main memory MM. The address counter of RM has already designated the RM6 in the step XVII so that the step XXIV transfers the numerical data in the RM6 into the main memory MM. The data transfer continues until the step XXV designates the RM7 and then the RM14. When the RM14 is designated, this is detected in the step XXVI, and the step shifts to the step XXVII. At this time, for example, the address counter in the main memory MM designates the MM14. If so, in the CON mode, the eight digits of the expanded data should be stored in the next numerical data storing portion N2 and not in the index part α2. The step XXVII sets all of the bits in the memory MM14 to "1", in order to present the numerical data from being stored in the memory MM14. The all "1" bit code has none of the effective role, as indicated in the bottom line of the right column in FIG. 23. After this, the step XXVIII advances the address in the main memory to the address 6 where it is set as to designate the MM20. Then, the step shifts to the step XIX where the newly inputted numerical data of expanded eight digits is transferred from the GR0 to GR7 to the main memory.

Where, when the step XXIX detects the clear key has operated, the operation is proceeded to step XXX to change the numerical data corresponding to the index data preceding imputted. The displayed numerical data to be newly stored is temporarily stored into RM14 to RM21 in the step XXX, and the preceding inputted index data is loaded into GR0 to GR5 in the step XXXI. Then, the subroutine SUB. 1 retrieves the numerical data area (address) corresponding to an index data coincided to the inputted index data. Step XXXII again detects to see whether a coincided index has been stored in the main memory MM. When no coincident is found, the operation shifts to the STOP. Where, a coincident is found, the numerical data temporarily stored RM14 to RM21 in the step XXX is reloaded to the GR0 to GR7 by the step XXXIII. With this state, the operation is then jumped to the step XIX to transfer the data stored in the general register GR to the main memory MM whereby the data changing operation completes.

Figure 28:
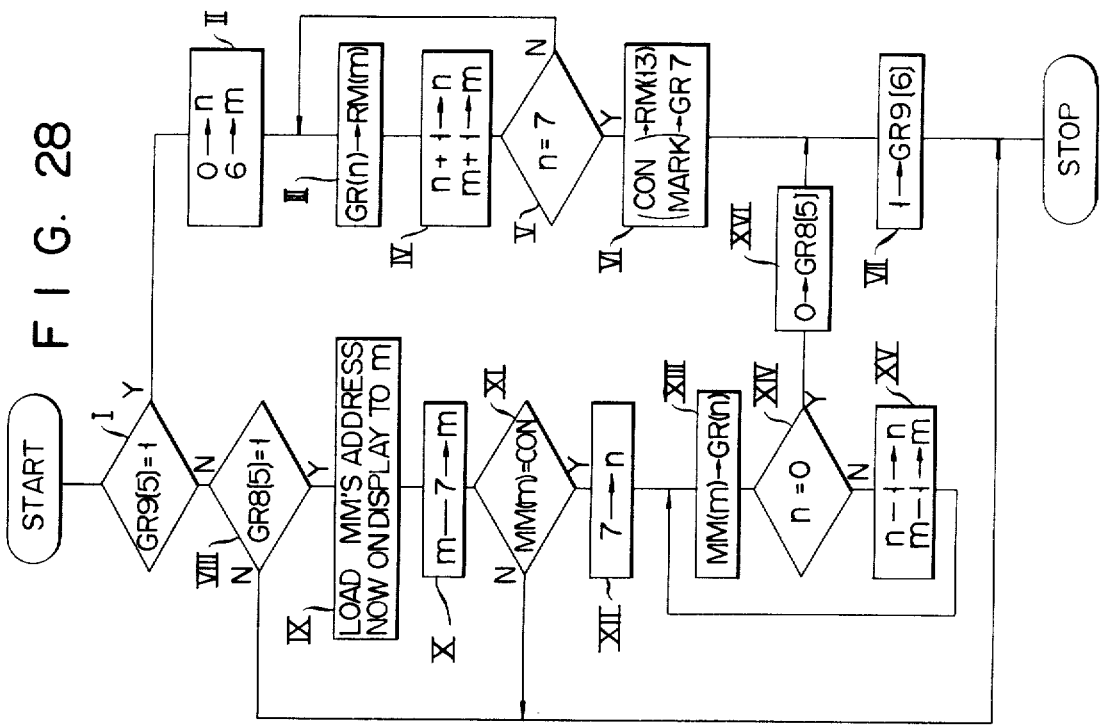

The explanation to be given with reference to FIG. 28 is the operation of data extension when the data continuous key (CON) 9 is operated. After START, the step I checks for the write mode resulting from the operation of the W key 6 depending on the contents of the GR9[5], that is to say, 1 or 0. When the GR9[5]=1, the step II sets the address (n) of the general register GR to 0, while sets the address (m) of the RAM RM to 6. Through the steps II, III, IV, V and VI, the numerical data (upper seven digits) of the GR and CON mark are temporarily stored in the addresses 6 to 13 (RM6 to RM13) of the RAM RM. After the step II designates the GR0 and RM6, the steps III, IV and V load the contents of the GR0 to GR6 into the RM6 to RM12. When the GR7 is designated in the step V, the operation shifts to the step VI where the CON mark data is transferred to the RM13 and to the GR7 for display. Following this, the step VII renders the GR9[6] "1" and sets up the CON mode and then the operation stops.

When the step I detects the operation is not in the write mode, the step VIII checks the GR8[5], i.e. the 5th bit of the general register GR8. When the GR8[5] is not "1", the mode is not read mode and the operation directly advances to STOP. When GR8[5]=1, the mode is the read mode. Accordingly, the step IX the address of the MM in which the numerical data being currently displayed had been stored into the address counter m. Then, the step X reversely shifts the address of the MM by seven addresses. For example, if the step IX makes a load of the MM20, it is to see if the CON mark data is stored or not in the MM13. The step XI is used for checking for existance of the CON mark in the MM13. When the mark is not detected, the operation stops since now displaying numerical data is not expanded one.

When the CON mark is found in the MM13, the operation step advances to the step XII. The steps XII to XV loads the upper data in the extension numerical data from the main memory MM to the GR7 to GR0 (the order is inverse for display). The step XII sets the address (n) in the GR to 7. In the step XIII, the contents of the main memory MM are successively transferred to the general register GR, in the order from the upper to lower digit of the MM contents. In the step XIV, the address n of the GR is checked. When n≠0, the step XV successively designates the preceeding address one by one. When the upper numerical data are all transferred from the MM to the GR, n=0 and the step shifts from the step XIV to step XVI to reset the read mode, and then shifts to step VII so that the CON flag is raised. Then the operation goes to stop.

Figure 29:
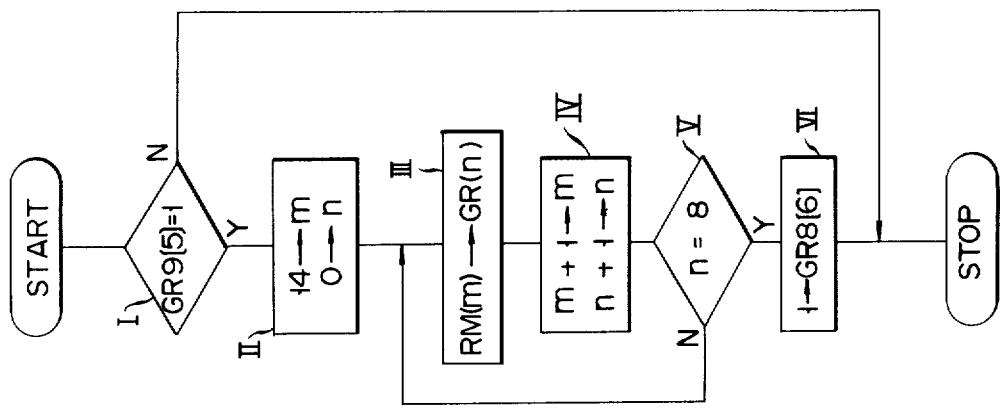

The flow of data when the CALL key 11 is operated will be given with reference to FIG. 29. The step I checks to see whether the apparatus operates in the write mode. If its mode is not the write mode, the GR9[5] is "0" and therefore the operation immediately stops. On the other hand, if it is the write mode, the steps II to V loads the data in the temporary registers RM14 to RM21 into the GR0 to GR7. In the step II, the address of the RM is set to 14 and the address of the GR is set to 0. Then, the contents of the RM is successively transferred into the GR in the steps IV to V. In the step V, when n=8, it indicates data is stored in the GR0 to GR7. In the step VI, the GR8[6] is "1", so that the CALL mode is set up and the operation stops.

Figure 30:
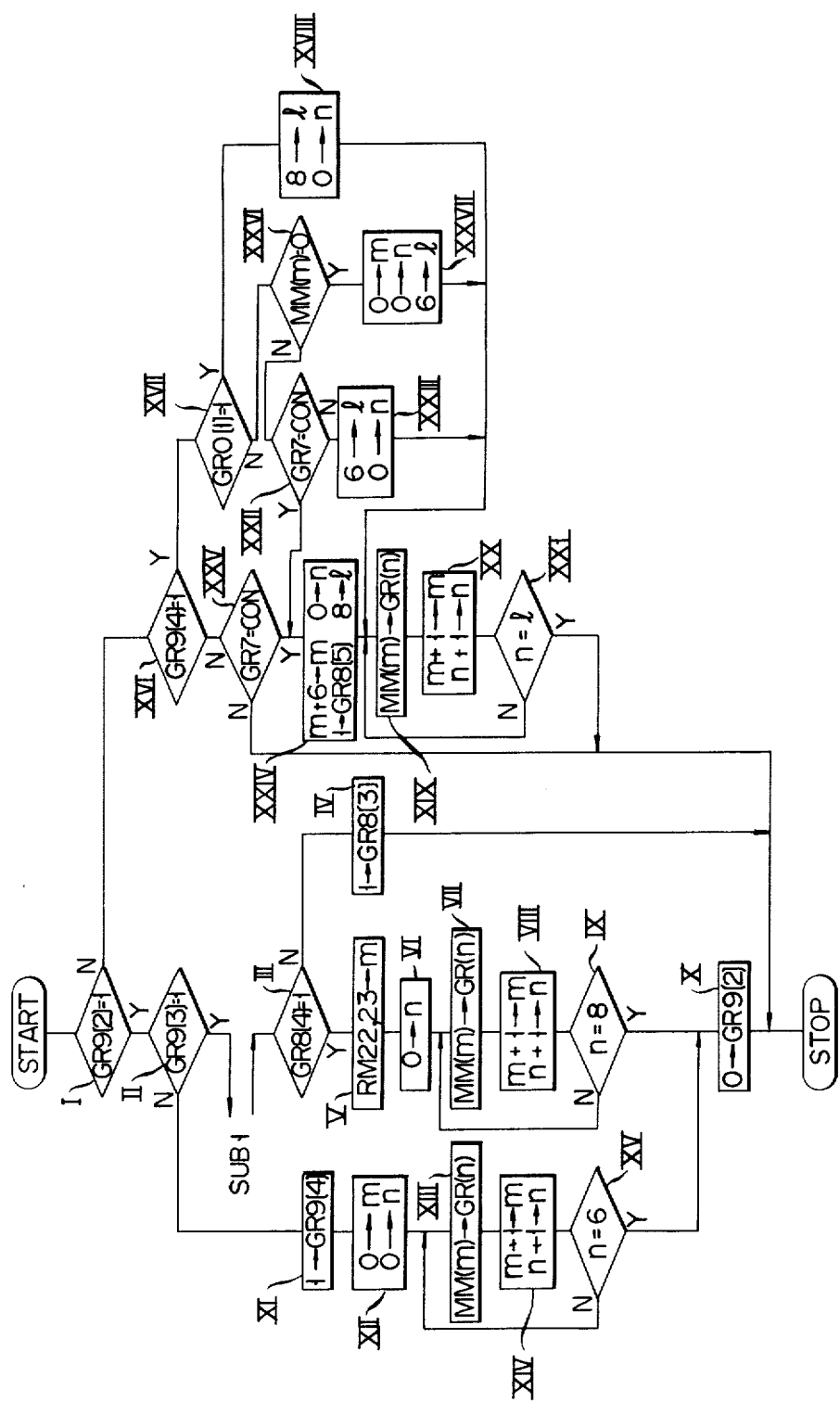

The operation of the apparatus when the read (R) key 7 is operated will be described with reference to FIG. 30. In the step I, it is checked whether the apparatus operates in the "α" mode. When it operates in the "α" mode, the step II is then executed. The step II checkes to see whether the alphabetical letter is keyed directly or not. This is done by checking the contents of the GR9[3]. When some alphabet letter is stored therein, the operation interrupts to the subroutine SUB. 1 shown in FIG. 26. The ensuing step III is used to see whether the inputted index data is coincident with the index data stored in the main memory MM. When GR8[4]≠1, the operation is in the error condition so that the step IV raises an error flag in the GR8[3], and the operation stops.

When GR8[4]=1, the step V sets the address number (m) of the numerical data of the coincident index data stored in the RM22 and RM23 into the address counter m of the main memory MM. In the steps VI to IX, the numerical data corresponding to the index data in the main memory is loaded into the GR0 to GR7 of the general register GR. Upon completion of the loading, the step X sets the GR9[2] to "0" to reset the "α" mode.

In the "α" mode, when none of alphabetical letters is inputted, the operation mode at that time is the auto-read mode. Accordingly, the step XI sets the GR9[4] to "1". Then, in the steps XII to XV, data is automatically read out from the main memory MM, successively from the head address MM0 every time of depression of R key. The step XII first sets the contents of the address counters m and n of the main memory MM and the general register GR to 0. The data in the main memory is successively transferred to the GR, from the head address to the subsequent ones. When six letters of index data are all transferred from the MM0 to MM5 to the GR0 to GR5, n=6 and the step XV advances to the step X. And the "α" mode is reset in the step X and the operation stops.

The "α" mode has been reset in the preceding routine, when the Read key is again depressed the step I advances to the step XVI. In the step XVI, the bit contents of the GR9[4] is checked. When it indicates the auto-read mode, GR9[4]=1 and the step proceeds to the step XVII. Here, the data displayed in the GR0 is the letter data or not is checked. As seen from FIG. 23, in this example, the most significant bits of the letter data codes are all set "1" so that, if the GR0[1]is "1", the display data is the alphabet letter. When the display data is the alphabet letter, the operation advances to the step XVIII where number 8 is set in the digit counter l for the main memory MM in order to display the numerical data following the display index data. And at the same time, it sets the address counter n of GR to 0. Then, in the steps XIX, XX and XXI, eight digits numerical data stored in the main memory MM is loaded into the general register GR.

When, in the step XVII, GR0[1] is "0", the next step XXVI detects to see whether any index is stored in the next index storing portion of the MM or not. When no index data is stored in the succeeding index portion, the next step XXVII resets the address counter m of the MM to 0 to display the head address data in the MM and set numeral 6 into the digit counter l to display the head six letters for index data.

When it is found through the operation of the step XXVI that some index is stored in the succeeding portion of the MM, the succeeding step XXII checkes to see whether the contents of the GR7 is the CON mark data or not. When it is not the CON mark data, the step XXIII sets 6 in the address counter of the main memory MM (6'1) while at the same time sets the address counter of the GR to 0 (O→n). Then, the steps XIX to XXI transfers the index data of six digits following the numerical data to the GR. When the contents is the CON mark data, nothing is stored in the address 6 of the main memory MM. Accordingly, the step XXIV, jumping six words of the MM address, sets the address counter n of the GR to 0 and sets the address counter l to 8, for the purpose of displaying the numerical data of eight digits to follow. Since the Read key is operated, the bit GR8[5] is set. In the succeeding steps XIX to XXI, the numerical data of eight digits in the main memory MM is transferred into the GR.

When the step XVI finds that the operation is not in the auto read mode, the step XXV checks to see if the data of the GR7 is the CON mark data or not. In the case of the CON mark data, the steps XXIV, XIX, XX, XXI execute the operation for displaying the lower digit of the numerical data extended. When the data of the GR7 is not the CON mark data, the operation is rendered to stop.

Figure 31:
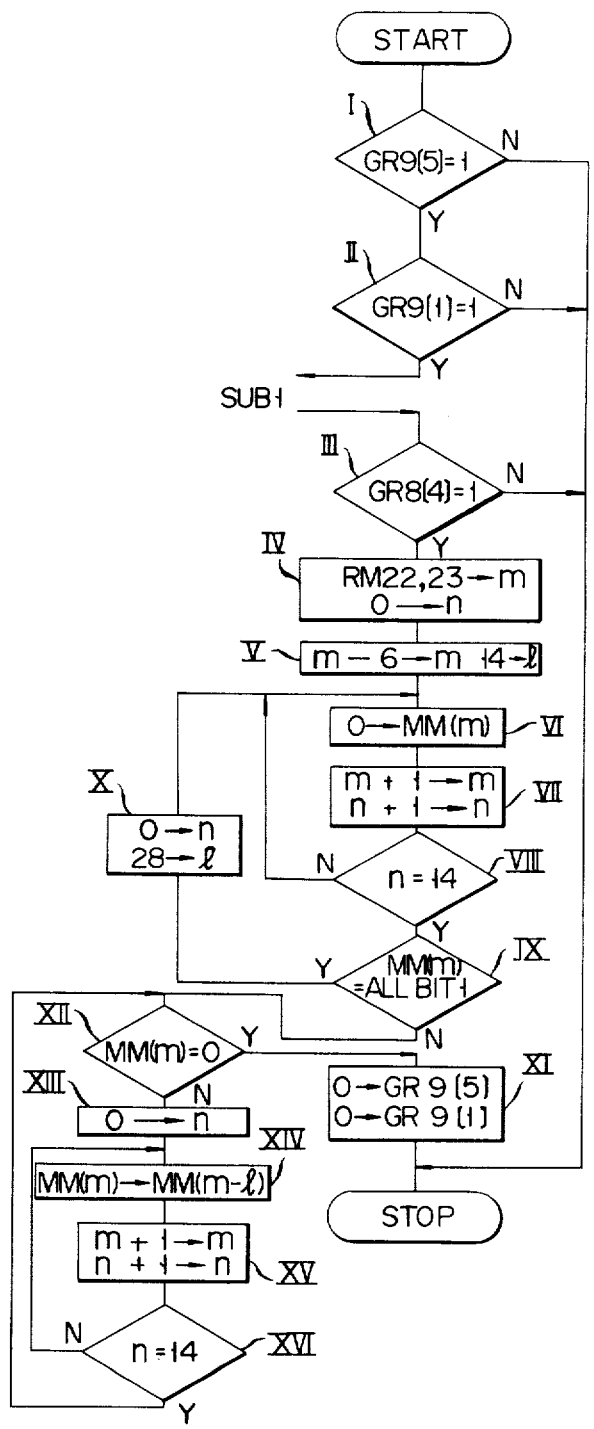

The explanation to follow is the operation when the memory data clear (MDC) key 10 is depressed. Reference is made to FIG. 31. The step I first checks to see whether it is in the write mode or not, depending on the bit contents of the GR9[5]. When it is not the W mode, nothing further is executed and the operation stops. In the case of the W mode, the step II checks to see whether the clear key has been depressed or not, with reference to the contents of the GR9[1]. When the clear key S-6 has not been depressed, the operation immediately stops. When the clear key has been depressed, after the operation of the subroutine SUB. 1 is executed, whether the main memory MM has the same index data as the inputted index data or not is checked. The coincident index searching is made by using the bit contents of the GR8[4], in the step III. If there is not found a coincident index, the data clear is not performed and the step reaches to STOP.

When there is found a coincident index data, the step IV designates the head address (m) of the coincident numerical data stored in the RM22 and RM23 while at the same time sets the counter n to 0. Then, the step V designates the address (m−6→m) before six digits, in order to clear the index data preceeding to the numerical data. At the same time, numeral 14 representing the number of the digits in which the data in the MM is to be pushed toward the head address is set in the digit counter 1. Under this condition, the contents of the address MM(m) specified of the main memory MM is cleared in the step VI. In the step VII, the address MM(m) is advanced step by step and is cleared and at the same time the contents of the counter n is increased one by one. With progression of the increment, the contents of the counter n becomes 14. At this time, the step progresses from VIII to the step IX. The step IX checks to see whether the contents MM(m) of the main memory specified address is all bit "1" or not. When it is all bit "1", it is the CON mode data. Accordingly, the step X sets again the contents of the counter n to 0, in order to clear the lower numerical data extended. Because the above-mentioned data pushing operation is to be done for two data units, the digit counter 1 is set to "28". On the other hand, when the MM(m) is not all bit "1", the operation advances to step XII in which any index has been stored in the next index portion of the main memory MM or not is checked. When some index has been stored, the information unit of 14 digits is through steps XIII, XIV, XV, XVI stored into the portion from which a data has been erased in the preceding steps. Every time the data unit is pushed toward the empty address of the main memory the operation returns to the step XII to check whether the index is stored or not. When the step XII detects no index, it can be seen that no data exists in the succeeding address, and the operation is advanced to the step XI. The next step XI sets the GR9[5] to 0 while sets the GR9[1] to 0, thereby to reset the write mode and at same time to reset the clear key.

Figure 32:
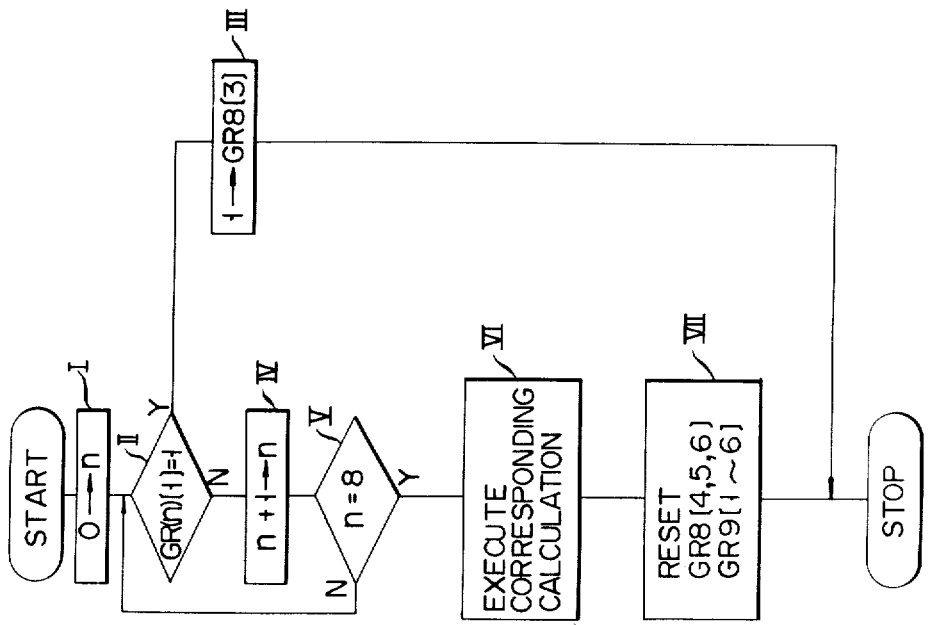

Finally, the operation when keys such as +, −, ×, ÷, M+, M−, √, +−, % are operated will be described with reference to FIG. 32. The step first sets the address n of the general register GR to 0. The steps I to IV check to see whether symbols other than numerals, for example, hyphen, are included in the numerical data being displayed. The step II checks to see whether the contents of the first bit of the address n of the general register GR(n) is "1" or not. As seen from FIG. 23, when the GR(n)[1] is "1", it indicates hyphen symbol or alphabetical letter code. Accordingly, the apparatus is in an error condition. In the step III, the bit of the GR8[3] is 1 and the error flag is set.

On the other hand, when GR(n)[1] is not "1", the data in this digit is calculable and the step IV similarly checks the data in the next digit (n+1). A similar data check continues till eight digits. Upon completion of the data check in the eight digits, the step proceeds from V to VI. The step VI executes the calculation corresponding to the numerical data stored in the GR and then the step VII resets GR8[4,5,6]-COIN flag, R mode flag, CALL mode flag. The same step also resets GR9[1-6]- clear mode, "α" mode, alphabetical letter mode, auto read mode, write mode, and CON mode.

Obviously many modifications and variations of the present invention are possible in the light of the teachings. It is therefore to be understood that within the scope of the appended claims in the invention may be practiced otherwise than as specifically described.

What is claimed is:

1. An electronic calculation/memorandum apparatus comprising:
    a housing;
    an alpha-numerical display on said housing;
    a first random access memory means for storing a plurality of pairs of sequence of entered alphabetical index data and numerical characters, each pair being stored at a given location;
    a second random access memory means for storing a sequence of numerical data;
    a keyboard mounted on said housing and having a plurality of manually operable alpha-numerical keys at least some of which are associated with both an alphabetical character and a numerical character and a plurality of mode changing keys, one of said mode changing keys being a first letter key for switching, following manual operation thereof, the apparatus into a memorandum mode and for entering a sequence of alphabetical characters to be stored in a first part of one location of said first memory means, a second write key for causing after first manual operation, said previously entered sequence of alphabetical characters to be stored, and, after subsequent manual operation, a sequence of numerical characters entered after said first operation to be stored in a second part of said one location of said first memory means, a read key for causing, after manual operation, stored sequences to be displayed and a call key for causing, after manual operation thereof and operation of said write key, a stored sequence in said second memory means to be stored in said second part of said one location of said first memory means;
    logic means connected to said, first random access memory means and second random access memory means, said display and said keyboard for carrying out arithmetic calculations upon sequences of numerical characters, storing the results thereof in a register and displaying said results in said alphanumeric display and for controlling storage in said locations in accordance with manual operation of said letter, read and write keys and storage in said second memory means when the apparatus is in memorandum mode of said results in said register.

2. An electronic calculation/memorandum apparatus according to claim 1 in which said keyboard includes a plurality of row lines to which a plurality of timing signals with different phases are supplied; a plurality of column lines intersecting said row lines; and a plurality of switching means provided at the cross sections of said row and column lines; and said logic means includes said timing signal forming means, a letter memory means for storing the operation of said first letter key, and a judging means for using the operated key as a character key when the letter memory means stores operation of said letter key, and as a numerical key when the letter memory means does not store operation of said letter key.

3. An electronic calculation/memorandum apparatus according to claim 2, said letter memory means comprising means for setting the letter memory means into a nonmemorizing state under a condition where said first letter key has been depressed by the operation of the write key or read key.

4. An electronic calculation/memorandum apparatus according to claim 2, further comprising means for setting said letter memory means into a nonmemorizing state under a condition where the first letter key has been depressed by redepression of said first letter key.

5. An electronic calculation/memorandum apparatus according to claim 1 wherein said logic means includes an arithmetic and logic unit for calculating the numerical data inputted from said keyboard.

6. An electronic calculation/memorandum apparatus according to claim 5, in which said logic means includes means for indexing the numerical data resulting from the calculation in said arithmetic and logic unit and for storing the index data with the numerical data in said first random access memory means.

7. An electronic calculation/memorandum apparatus according to claim 5, in which said logic means comprises means for temporariliy storing the numerical data displayed in said display by the operation of the letter key, means for storing the index data corresponding to the numerical data held in said temporary storing means, means for loading the index stored therein into said first part of one location of said first memory means responsive to the write key operation; and means for reading out the numerical data stored in said temporary storing means and loading it into said second part of one location of said first memory means relating to said second part of one location of said first index.

8. An electronic calculation/memorandum apparatus according to claim 7, further comprising means for loading the index data inputted after the operation of key into said temporary storing means through the operation of the write letter key and setting the apparatus to a write mode, and means for loading in the write mode the index data and the corresponding numerical data as one information unit into said memory means through the operation of the write key and for releasing the write mode.

9. An electronic calculation/memorandum apparatus according to claim 1, further comprising: a temporarily storing register for storing the index data inputted after the operation of said first letter key responsive to the operation of the write key, and means for reading out the index data from said temporarily storing register by the operation of the write key after the inputting of the numerical data corresponding to the index data and for loading the index data and the numerical data as one information unit into said first random access memory means.

10. An electronic calculation/memorandum apparatus according to claim 1, further comprising means for comparing the index data inputted with the index stored in said first random access memory means and means for displaying a given symbol when a coincidence therebetween is detected by said comparing means.

11. An electronic calculation/memorandum apparatus according to claim 1, in which said first random access memory means has a memory capacity capable of storing a plurality of information units each including the alphabetical index data and the numerical data, and said logic means includes means for displaying the number of information units in which data has not been stored.

12. An electronic calculation/memorandum apparatus according to claim 5, further comprising means for comparing the output alphabetical data with the alphabetical index data stored in said first random access memory means and for supplying the numerical data retrieved corresponding to the alphabetical index data of which the coincidence is detected by said comparing means to said arithmetic and logic unit for calculation.

13. An electronic calculation/memorandum apparatus according to claim 12, further comprising means for producing an error signal when said numerical data retrieved includes other data than numeral.

14. An electronic calculation/memorandum apparatus according to claim 1, further comprising means for comparing the index data inputted before the operation of the read key with the index data stored in said first random access memory means and means for displaying an error symbol on display means when no coincidence is detected by said comparing means.

15. An electronic calculation/memorandum apparatus according to claim 1, further comprising means for detecting an error in the writing or reading operation for loading or reading the index data or the numerical data after the operation of said first letter key to set up an error condition, means for displaying the error condition, means for inputting a clear instruction from the logic means at the setting up of the error condition, and means for removing the error condition in response to the clear instruction and at the same time sustaining the operation condition of said letter key.

16. An apparatus as in claim 1, wherein said logic means causes said apparatus to operate in a memorandum mode in which said alphanumeric pairs of sequences are stored and a calculation mode in which said arithmetic calculations are carried out, said logic means causing said apparatus to change mode upon each operation of said first letter key.

17. An apparatus as in claim 16, wherein said display includes means for displaying simultaneously a given number of numerals, said keyboard includes a data continuous key for causing, after manual operation following entry of a first sequence of numerical characters in said memorandum mode, a second sequence of numerical characters to be stored at a given location so that upon successive operations of said read key in said memorandum mode said first and second sequences are successively displayed.

18. An electronic calculation/memorandum apparatus according to claim 17, further comprising
means for displaying a given symbol with said first numerical data retrieved in response to the read key operation on the display means when the digit number of the numerical data exceeds the maximum one on the display, and means for reading out said second numerical data corresponding to the index data, responsive to the reoperation of the read key when the given symbol is displayed and then for displaying said second data.

19. An electronic calculation/memorandum apparatus according to claim 18, in which said given symbol is displayed at the least significant digit.

20. An electronic calculation/memorandum apparatus according to claim 16, further comprising means for successively reading out the index data and the numerical data stored in said memory means in the storing order, every time the read key is operated.

21. An electronic calculation/memorandum apparatus according to claim 16, in which said logic means further includes a means for setting an automatic read-out mode by combining the operations of a plurality of keys.

22. An electronic calculation/memorandum apparatus according to claim 21, further comprising means in which, after said automatic read-out mode is set, the data stored in said memory means are successively read out every time the read key is operated and the read-out one is displayed.

23. An electronic calculation/memorandum apparatus according to claim 22, further comprising means for alternately reading out alphabet letters for the index data and its related numerical data which constitute said data.

24. An electronic calculation/memorandum apparatus according to claim 22, further comprising means for successively reading out the data from said memory means in the order of the memory address, through the operation of the read key, and means for providing such an operation that, when the reading operation reaches the stored final address, it returns to the first address to continuously proceed.

25. An electronic calculation/memorandum apparatus according to claim 21, further comprising means for releasing the mode of the automatic read-out when another key than the read key is operated.

26. An electronic calculation/memorandum apparatus according to claim 1, in which electric power is constantly supplied to said memory means for sustaining the stored data.

27. An electronic calculation/memorandum apparatus according to claim 1, in which said logic means includes a timer means which is retriggered by manual operation of said keyboard, and means for deenergizing said display by the output of the timer means when said keyboard is not operated for a given time or more.

28. An electronic calculation/memorandum apparatus according to claim 10, comprising a means for displaying an error symbol when an index data same as the index data inputted before the write key is operated is stored in the memory section means.

29. An apparatus as in claim 17, wherein said logic means includes a central processing unit and an input data section.

* * * * *